US012691022B1

(12) United States Patent
Ihli et al.

(10) Patent No.: US 12,691,022 B1
(45) Date of Patent: Jul. 28, 2026

(54) EXERCISE CHAIR METHODS AND APPARATUS

(71) Applicants: Stephen P. Ihli, Santa Monica, CA (US); Mark A. Krull, New Braunfels, TX (US)

(72) Inventors: Stephen P. Ihli, Santa Monica, CA (US); Mark A. Krull, New Braunfels, TX (US)

( * ) Notice: Subject to any disclaimer, the term of this patent is extended or adjusted under 35 U.S.C. 154(b) by 585 days.

(21) Appl. No.: 17/577,699

(22) Filed: Jan. 18, 2022

Related U.S. Application Data

(60) Provisional application No. 63/138,839, filed on Jan. 19, 2021.

(51) Int. Cl.
*A61H 1/02* (2006.01)
*A61H 9/00* (2006.01)

(52) U.S. Cl.
CPC ......... *A61H 1/0218* (2013.01); *A61H 9/0078* (2013.01); *A61H 2001/0233* (2013.01); *A61H 2201/0149* (2013.01); *A61H 2201/0192* (2013.01); *A61H 2201/1238* (2013.01); *A61H 2201/1623* (2013.01); *A61H 2201/1635* (2013.01); *A61H 2201/164* (2013.01); *A61H 2201/5056* (2013.01)

(58) Field of Classification Search
CPC .. A61H 1/0218; A61H 1/0222; A61H 1/0229; A61H 1/0292; A61H 9/0078; A61H 2201/164; A61H 2201/0149; A61H 2201/0192; A47C 9/002; A63B 41/02; A63B 21/4029
See application file for complete search history.

(56) References Cited

U.S. PATENT DOCUMENTS 4,966,413 A * 10/1990 Palarski .................. A47C 7/38 297/284.6
5,190,348 A * 3/1993 Colasanti ............... A47C 7/467 297/DIG. 8
5,637,076 A * 6/1997 Hazard ................ A61H 9/0078 297/284.6
5,713,841 A * 2/1998 Graham ............... A61H 1/0218 606/240
6,435,611 B1 * 8/2002 Walter ................. A61H 1/0222 601/24

(Continued)

FOREIGN PATENT DOCUMENTS

WO WO-2017207816 A1 * 12/2017 ............. A61G 15/10

*Primary Examiner* — Brandy S Lee
*Assistant Examiner* — Mishal Zahra Hussain

(57) ABSTRACT

A back stretching exercise apparatus includes a base configured to occupy a stable upright position on top of an underlying floor surface, an upper body support configured to support a person's back, and a lower body support configured to support at least the lower halves of a person's legs. Each support is operatively connected to the base to accommodate a person occupying a back relaxing position with his lower legs resting on the lower body support, his back pressing against a portion of the upper body support facing generally toward the lower body support, and his hips lowered into a gap between the upper body support and the lower body support to establish a generally V-shape between his upper legs and his torso and to place his lower lumbar region in gentle traction.

22 Claims, 24 Drawing Sheets

(56) References Cited

U.S. PATENT DOCUMENTS

| | | | | |
|---|---|---|---|---|
| 7,322,651 | B2 * | 1/2008 | Makhsous | A47C 17/163<br>297/284.6 |
| 8,051,512 | B2 * | 11/2011 | Teeter | A61G 7/015<br>297/344.17 |
| 9,427,371 | B1 * | 8/2016 | Lamar | A47C 1/032 |
| 2008/0243040 | A1 * | 10/2008 | Kuwabara | A61H 9/0078<br>601/149 |
| 2011/0313334 | A1 * | 12/2011 | Almeida | A61H 9/0078<br>601/134 |
| 2021/0169234 | A1 * | 6/2021 | Jacobs | H01R 24/78 |
| 2022/0167754 | A1 * | 6/2022 | Fukuyama | A61G 7/002 |
| 2022/0386781 | A1 * | 12/2022 | Hergott | H05B 1/0227 |

* cited by examiner

Fig. 16
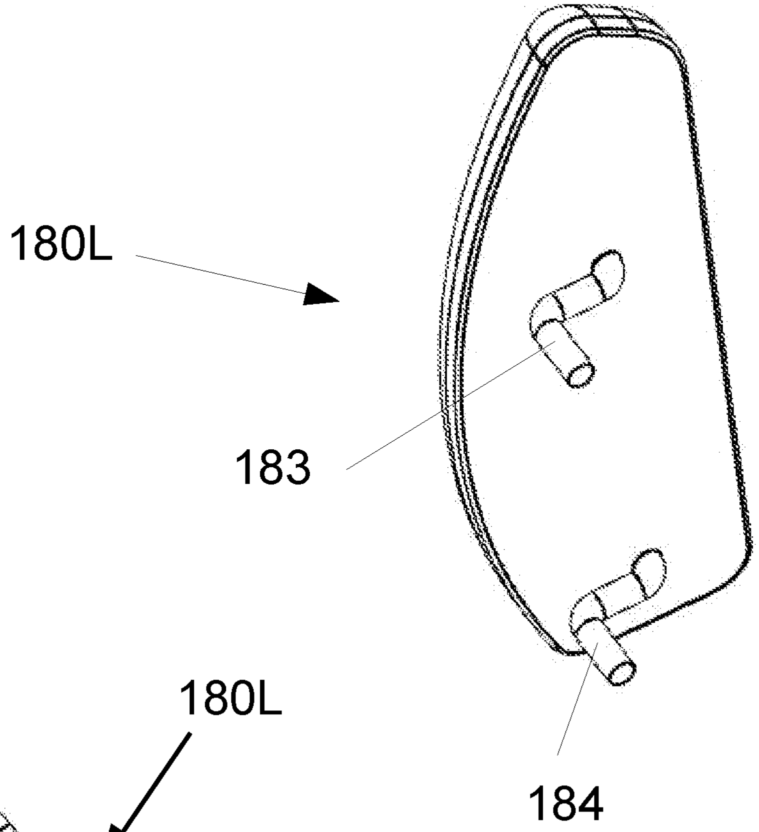
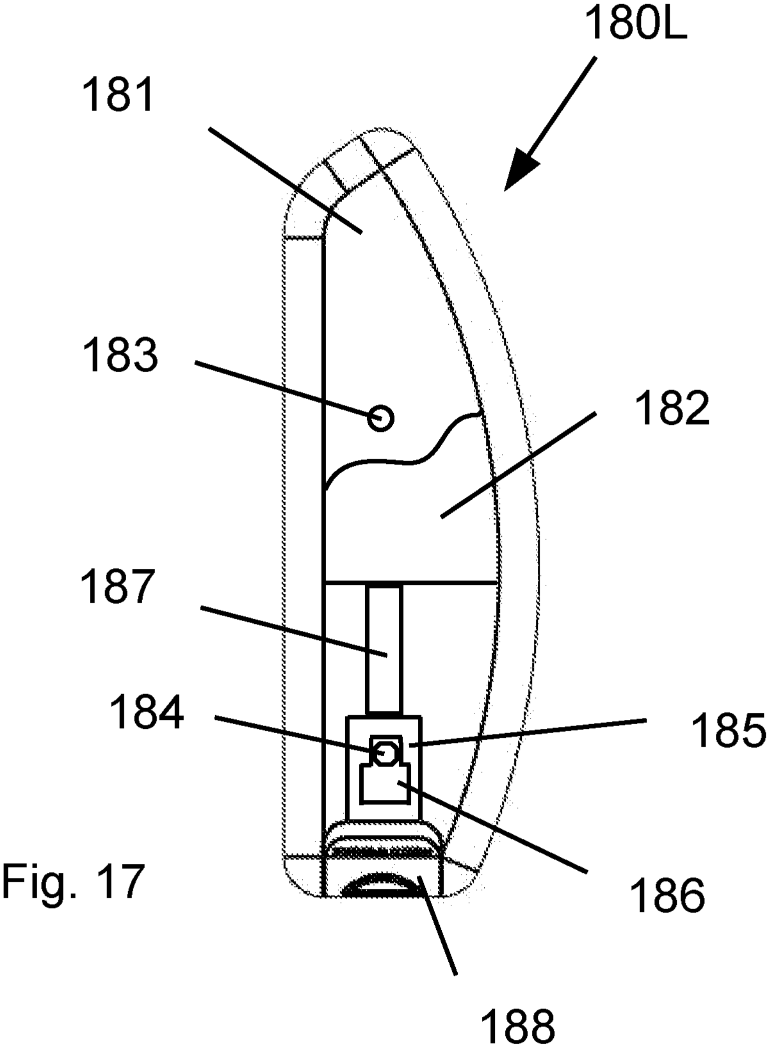
Fig. 17

EXERCISE CHAIR METHODS AND APPARATUS

CROSS-REFERENCE TO RELATED APPLICATION

Disclosed herein is subject matter entitled to the earlier filing date of U.S. Provisional No. 63/138,839, filed Jan. 19, 2021.

FIELD OF THE INVENTION

The present invention relates to exercise equipment, and more specifically, to methods and apparatus for comfortably supporting and/or gently stretching the back of a person in a seated position.

BACKGROUND OF THE INVENTION

Back pain and/or discomfort is a problem that is both serious and widespread. With varying degrees of success, many products and procedures and therapies have been developed to eliminate back pain and/or relieve back pain and/or improve the condition of a person's back and/or improve the comfort of a seated person. An object of the present invention is to provide new and improved methods and apparatus for comfortably supporting and/or relaxing and/or stretching the back of a person in a seated position, as well as associated methods of making and/or using such apparatus.

SUMMARY OF THE INVENTION

The subject invention may be described as an apparatus, such as a chair or lounge, that is suitable for back relaxation, back comfort, back massage, back stretching and/or back therapy. The subject invention also may be described in terms of a method of relaxing, comforting, stretching, and/or massaging a person's back, including the lower lumbar region. The methods and apparatus of the subject invention may also be found suitable for exercising a person's abdominal muscles while the person maintains a static position.

Among other things, the present invention may be described in terms of an exercise apparatus for use by a person. The apparatus includes a frame configured to occupy a stable upright position relative to an underlying floor surface, and a backrest configured to underlie and support the person's back. The backrest is movably mounted on the frame for movement through a range of orientations, including 30 degrees from vertical. The apparatus further includes a leg rest configured to underlie and support the person's legs. The leg rest is operatively connected to the frame to occupy a position forward of the backrest and define a variable length gap between the leg rest and the backrest. The gap increases in length in response to any combination of (i) movement of the backrest toward a more vertical orientation and (ii) movement of the leg rest away from the backrest. Conversely, the gap decreases in length in response to any combination of (i) movement of the backrest toward a more horizontal orientation and (ii) movement of the leg rest toward the backrest, wherein a person's bottom spans the gap without any underlying support.

Alternatively, the present invention may be described in terms of a back stretching chair. The chair includes a base configured to occupy a stable upright position relative to an underlying floor surface, and a backrest movably mounted on the frame for movement through a range of orientations, including 30 degrees from vertical. The backrest has an upper portion configured and arranged to underlie and support a person's middle back and upper back, and a lower portion configured and arranged to underlie and support a person's lower back, and the lower portion includes an inflatable dome. The chair further includes a lower body support configured to support a person's legs. The lower body support is disposed in front of the backrest to accommodate a person occupying a back relaxing position with his legs resting on the lower body support at an elevation above his hips, his lower back pressing against the inflated dome, and his buttocks occupying a gap between the upper body support and the lower body support.

Various features and/or advantages of the present invention will become apparent from the more detailed description that follows.

BRIEF DESCRIPTION OF THE DRAWING

With reference to the Figures of the Drawing, and wherein like numerals represent like parts throughout the several views:

FIG. 16 is a mostly bottom perspective view of an armrest component shown in FIG. 15;

FIG. 17 is a partially sectioned top view of the armrest component of FIG. 16;

DETAILED DESCRIPTION OF THE PREFERRED EMBODIMENT

Figure 1:
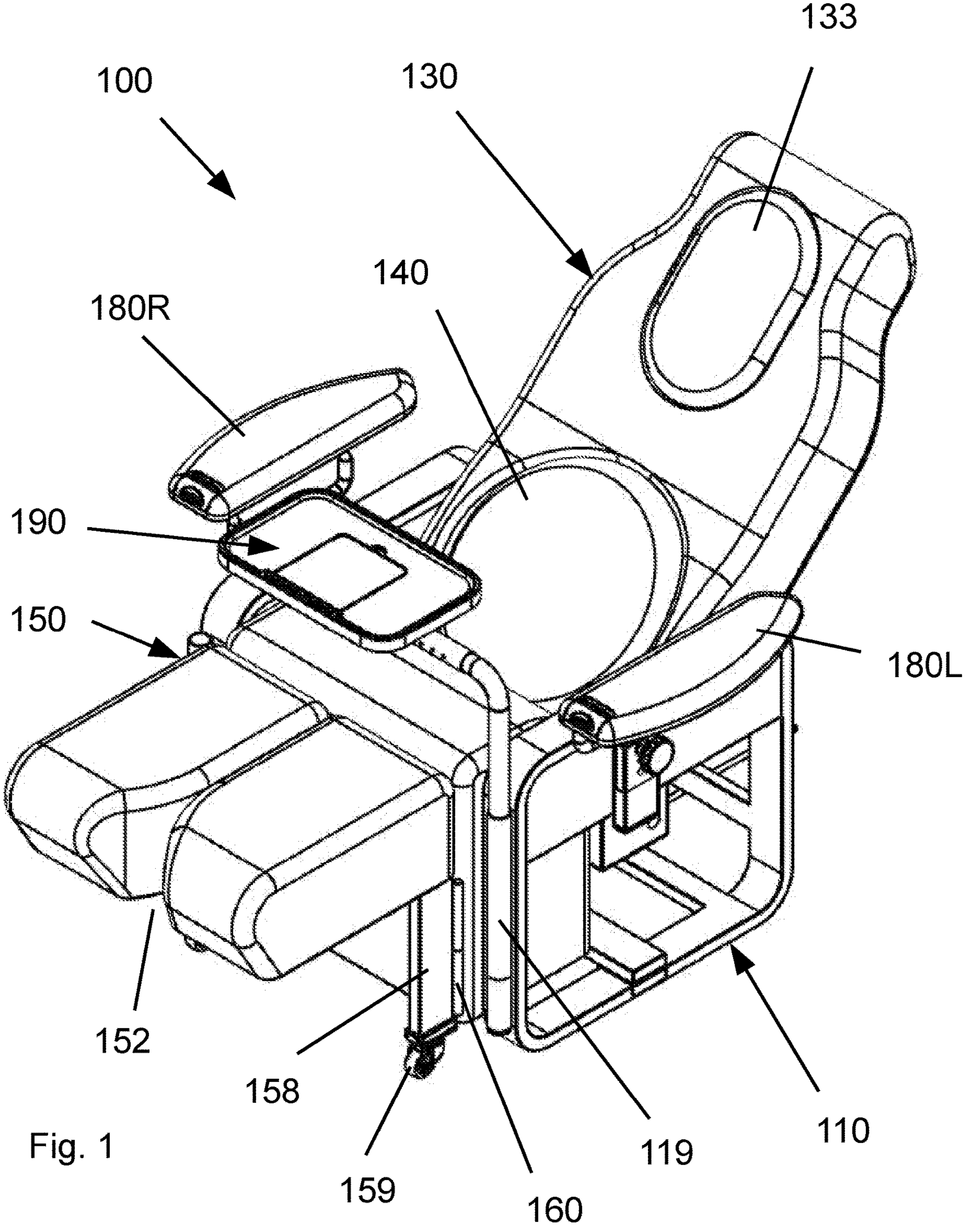
FIG. 1 is a perspective view of a first apparatus constructed according to the principles of the present invention and arranged in a first configuration.

FIG. 1 shows a first apparatus 100 constructed according to the principles of the subject invention. The apparatus 100 may be described in various ways, including as a back relaxing, back comforting, back stretching, back massaging, back therapy, and/or back exercise apparatus, bed, chair, recliner, and/or lounge. The apparatus 100 may also be described as an abdominal exercise apparatus.

To supplement this description of the subject invention, the following patents are incorporated herein by reference: U.S. Pat. No. 11,089,967 to Kawamura; U.S. Pat. No. 10,327,553 to Kiwak et al.; U.S. Pat. No. 8,834,380 to Mochizuki; U.S. Pat. No. 7,673,933 to Lawson; U.S. Pat. No. 7,344,488 to Weck et al.; U.S. Pat. No. 4,669,778 to Rogers, Jr.; and U.S. Pat. No. 3,934,927 to Zur. Among other things, these patents disclose details of chair construction, chair components, and associated methods; and/or details of air bladder construction, air bladder components, and associated methods.

Figure 4:
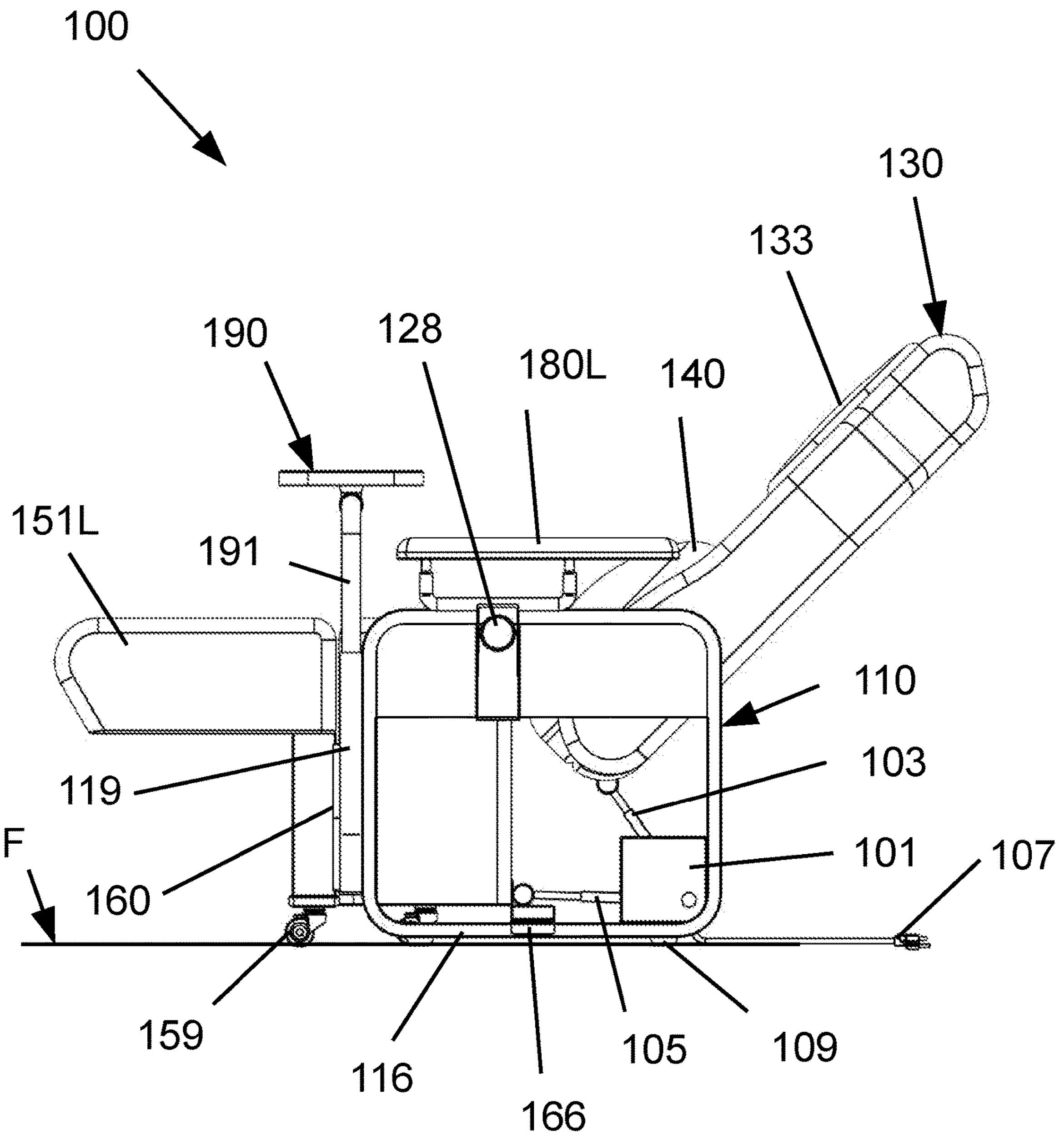
FIG. 4 is a left side view of the apparatus of FIG. 1.

The apparatus 100 includes a base or frame 110 configured to occupy a stable orientation or position on top of and/or relative to an underlying floor surface (designated as F in FIG. 4). The frame 110 may be made of any suitable materials known in the art, including steel tubes that are welded to one another, for example. The frame 110 is preferably rigid and operatively interconnects and/or supports various other components as further described below. On the embodiment 100, left and right bottom frame members 116 are disposed on respective sides of the apparatus 100 and extend parallel to the underlying floor surface F. Leveling and non-marring feet 109 (of a type known in the art) are threaded upward into the frame members 116 and extend downward from the frame members 116 to engage the floor surface F in a manner known in the art.

A backrest or back support or upper body support 130 is operatively connected to the frame 110 for pivoting or rotating about a pivot axis X. On the apparatus 100, for example, a cylindrical metal rod or axle or shaft 139 extends through a low-friction sleeve that is defined and/or rigidly mounted inside the backrest 130, and the ends of the shaft 139 are rigidly connected to the frame 110 (via nuts and bolts, for example). The pivot axis X coincides with the longitudinal axis of the shaft 130 and extends laterally (left to right or right to left) through the back support 130 and parallel to the floor surface F. On the embodiment 100, the pivot axis is approximately 18 inches above the floor surface F, and the backrest 130 is pivotal through an angle or range of ninety degrees from a vertical orientation to a horizontal orientation. This range may alternatively be described as moving through an angle of at least 60 degrees and/or between a predominantly horizontal orientation (within 15 degrees of horizontal) and a predominantly vertical orientation (within 15 degrees of vertical). Persons skilled in the art will recognize that alternative embodiments may have back supports capable of rotating to a greater or lesser extent, depending on factors such as intended use. For example, a relatively small range of orientations may be sufficient for certain therapy protocols, whereas a relatively large range of orientations may be preferred for greater utility, such as converting from a chair configuration to a bed configuration. Also, in manners customary in the art, the back support and/or portions thereof may define back engaging surfaces that are straight and/or flat and/or curved and/or any comfortable combination thereof.

A leg rest or lower body support 150 is operatively connected to the frame 110 for translational movement back and forth relative to the frame 110. On the apparatus 100, for example, the leg rest 150 includes a bracket 166 having opposite left and right downwardly opening channel members that capture, track, and/or slide along respective frame members 116. The leg rest 150 also includes conventional caster wheels 159 and 169 that rollably engage the underlying floor surface F.

On the embodiment 100, the leg rest 150 includes a rearward leg support or upper leg support 161, as well as left and right forward leg supports or lower leg supports 151L and 151R. The labeling of these parts is for ease of reference and general in scope, and thus, does not preclude some portion of a user's lower legs engaging the upper leg support 161, and/or some portion of a user's upper legs engaging the lower leg supports 151L and 151R. In other words, the leg support 161 could alternatively be described as a first leg support, and the leg supports 151L and 151R could alternatively be collectively described as a second leg support. On the apparatus 100, the lower leg supports 151L and 151R are movably connected to the upper leg support 161 via respective left and right vertical hinges 160 (see FIG. 1). Collectively, the left supports 161 and 151L and 151R define a leg rest 150 having a height of approximately 22 inches (which may alternatively be described as at least 18 inches and/or in the range of 18 to 27 inches), a fore-to-aft length of approximately 30 inches (which may alternatively be described as at least 27 inches and/or in the range of 27 to 36 inches), and a left-to-right or lateral width of approximately 21 inches (which may alternatively be described as at least 18 inches and/or in the range of 18 to 24 inches).

On some alternative embodiments, the lower leg supports 151L and 151R are replaced by a unitary lower leg support that is movably connected to the upper leg support 161 in different ways, including horizontal hinges, for example, as on many traditional recliner chairs (e.g. see some of the patents incorporated by reference). On other alternative embodiments, the entire leg rest 150 is replaced by a single unitary component that may be comparable in construction to a large footstool or ottoman (see FIGS. 21-23, for example).

The upper body support 130 and the leg rest 150 are designed to comfortably engage and/or support the relevant portions of a person's body. On the apparatus 100, each of these supports is reinforced and padded and upholstered in a manner known in the art. Generally speaking, each such support includes a rigid internal frame structure, a supple external cover, and resilient padding material captured and/or sandwiched therebetween. On some alternative embodiments, the internal structures of the body support 130 and/or the leg rest 150 are externally cushioned in any of various manners known in the art, including foam over-molding and/or exterior cushions or pads or pillows secured on top of the underlying support structure.

The upper body support 130 extends from a head end 131 to an opposite, bottom end 132. As shown in FIGS. 1-4, for example, the upper body support 130 includes a dedicated headrest 133 proximate the head end 131. On the apparatus 100, the headrest 133 is a gas-filled bladder containing a desired amount of air or other gaseous composition. On some alternative embodiments, headrests are provided in other forms, including for example, foam, which may be softer durometer foam than the padding material disposed inside the surrounding upper body support 130. On other alternative embodiments, headrests are simply the same as the surrounding upper body support 130. On still other alternative embodiments, a separate, self-contained pillow is provided independent of the upper body support 130, and is preferably adjustably connected thereto by suitable means, including a strap and/or hook-and-loop fasteners, for example.

The upper body support 130 also includes a second gas-filled bladder 140 configured and arranged to engage a person's lower back or lumbar region proximate the bottom end 132 of the upper body support 130. On the apparatus, 100, the lower bladder 140 is a gas-filled bladder containing a desired amount of air or other gaseous composition. Generally speaking, the lower bladder 140 and its associated structure may be alternatively described as a somewhat smaller diameter equivalent to a commercially available BOSU™ ball having its rigid base connected to and/or integrated into the internal structure of the upper body support 130, and having its resilient dome projecting outward beyond the surrounding upholstered surface of the upper body support 130. The lower bladder 140 may alternatively be described as an approximately hemispherical bladder or inflatable cushion having a diameter of approximately 18 inches and a height (measured perpendicular to the diameter) of approximately 7 inches. The term "approximately hemispherical" is used to connote or mean one-half of a sphere and/or at least one-third of a sphere and/or between one-third of a sphere and one-half of a sphere. In addition and/or in the alternative, this term is also used to connote or mean a somewhat flattened hemisphere having a less protruding or less pronounced crown or apex (e.g. the height of 7 inches is less than one-half the diameter of 18 inches because the radius of curvature increases near the apex).

The upper body support 130 has a length of approximately 40 inches, as measured from the head end 131 to the bottom end 132 (which may alternatively be described as at least 36 inches and/or in the range of 36 to 48 inches). The pivot axis X occupies a common plane with a similarly oriented or parallel diameter of the bladder 140, and this common plane bisects the bladder 140. The head end 131 of the upper body support 130 is approximately 32 inches from this reference plane, and the opposite, bottom end 132 is approximately 8 inches from this reference plane. The left-to-right or lateral width of the upper body support 130 is approximately 21 inches (which may alternatively be described as at least 18 inches and/or in the range of 18 to 24 inches). The depth or thickness of the upper body support 130 depends on the nature and allocation of its structural elements. On the embodiment 100, the upper body support 130 defines an upper back engaging surface that is approximately 4 inches lower or recessed from the apex of the bladder 140 when the bladder is inflated to 0.9 psi.

The first or rearward leg support 161 may be described as a block configured and arranged primarily to engage and/or underlie portions of a person's upper legs or thighs. The rearward leg support 161 has an upwardly facing surface, a rearward facing surface, and a gently rounded upper rear edge or corner extending therebetween. On the apparatus 100, the upwardly facing surface and the rearward facing surface are flat, but can alternatively be described of having a radius of curvature between 30 inches and infinite. In between these two surfaces, the rounded edge defines a radius of between four inches and eight inches and preferably six inches. The padding in the region of this rounded edge and along both the upward facing surface and the rearward facing surface is designed to resiliently compress or deflect in a manner that comfortably accommodates different angles of a person's upper legs relative thereto.

Each of the forward leg supports 151L and 151R may be described as a block-shaped wing or leaf or shelf configured and arranged primarily to underlie a person's respective lower legs and feet. Each of the forward leg supports 151L and 151R may also be described as providing an extension for the upwardly facing surface on the rearward leg support 161. On the embodiment 100, the forward leg supports 151L and 151R are provided as separate parts primarily to accommodate mounting and dismounting of the apparatus 100. On some alternative embodiments of the present invention, a unitary leg support is provided in the alternative (e.g. see FIGS. 21-23).

Figure 2:
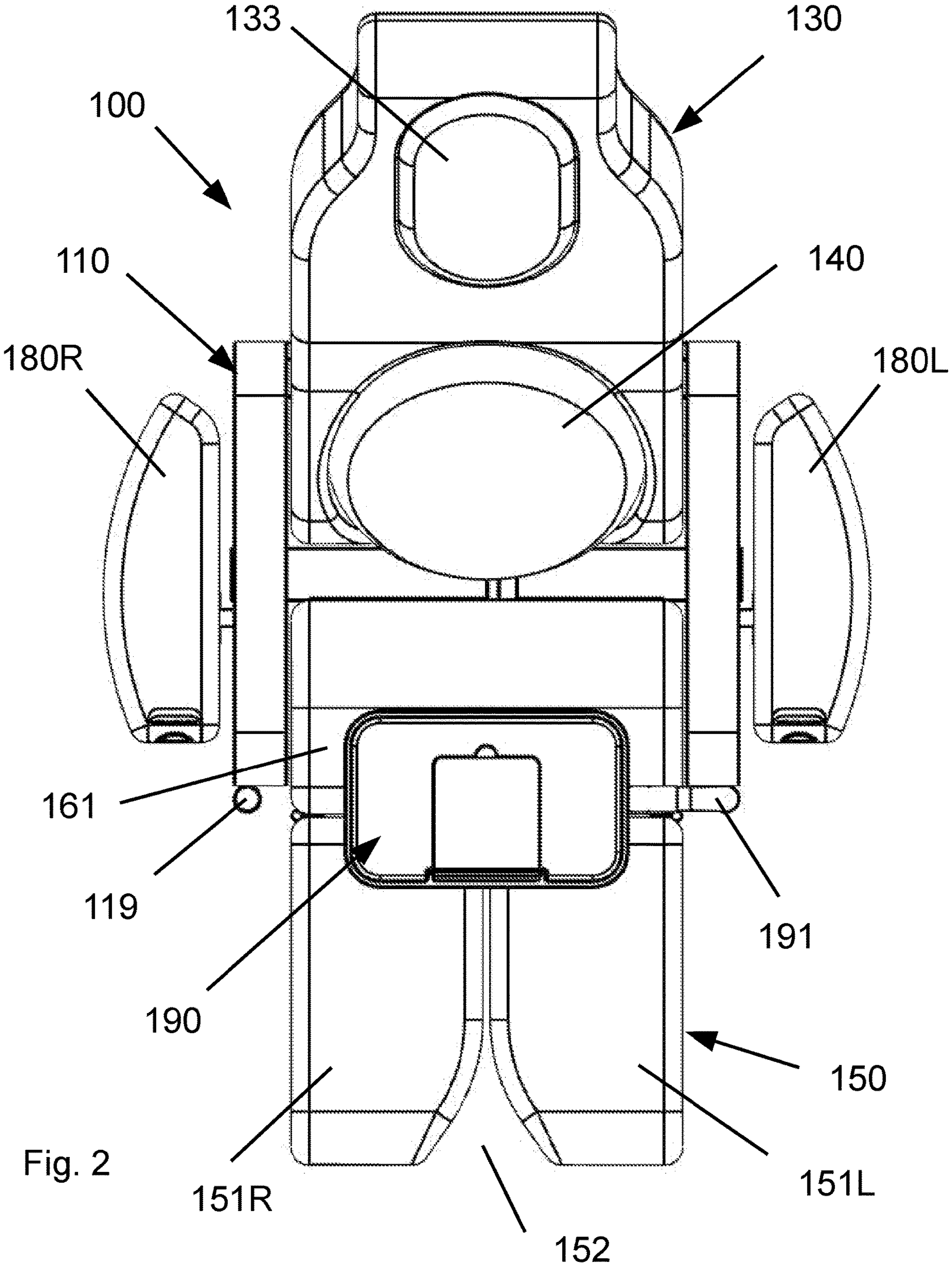
FIG. 2 is a top view of the apparatus of FIG. 1.
Figure 3:
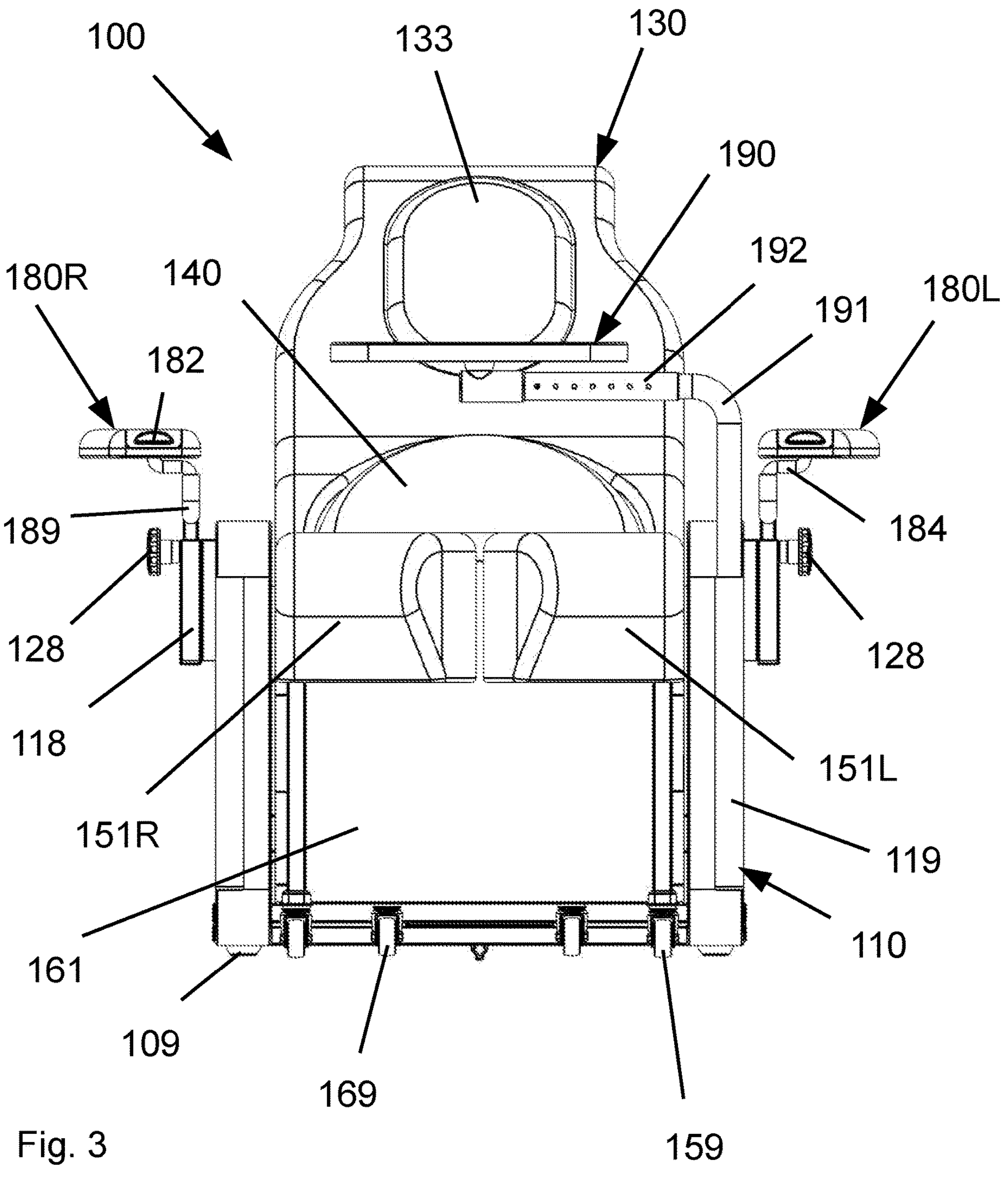
FIG. 3 is a front end view of the apparatus of FIG. 1.
Figure 5:
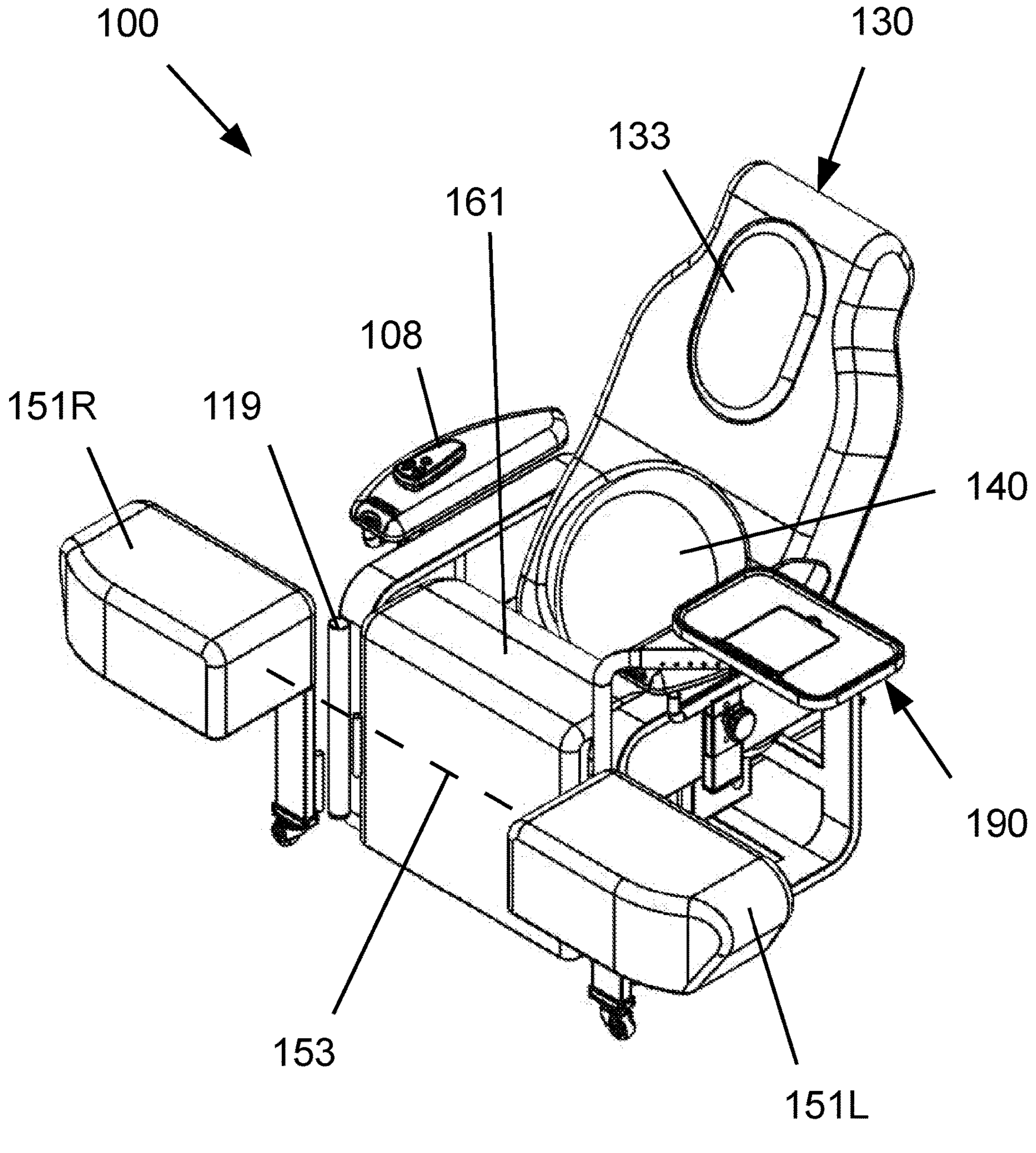
FIG. 5 is the same perspective view of the apparatus of FIG. 1, but with the apparatus arranged in a second configuration.

On the embodiment 100, each forward leg support 151L and 151R is rigidly mounted to a proximate, upper portion of a respective rigid leg 158, and a respective caster wheel 159 is mounted to an opposite, bottom end of each leg 158. An intermediate portion of each leg 158 is operatively connected to a respective side of the rearward leg support 161 via a respective hinge 160 as noted above. As shown in FIG. 5, for example, and as further discussed below, the hinges 160 accommodate spreading of the forward leg supports 151L and 151R apart from one another to assist a person in mounting and dismounting the apparatus 100. As shown in FIGS. 1-3, for example, the proximate corners of the distal or forward ends of the forward leg supports 151L and 151R are shaped or chamfered to define a gap 152 therebetween to facilitate separation in response to insertion of a person's leg or foot into the gap 152. While accommodating pivoting of the forward leg supports 151L and 151R relative to the rearward leg support 161, the hinges 160 constrain all of the leg supports 161 and 151L and 151R to move back and forth together relative to the frame 110.

On the preferred embodiment apparatus 100, left and right armrests 180L and 180R are operatively connected to respective sides of the frame 110. FIGS. 16-17 show the left armrest 180L in relatively greater detail, and the right armrest 180R is a mirror copy of the left armrest 180L. Like the other body supports, the armrests 180L and 180R are preferably padded and upholstered for user comfort. On some alternative embodiments, the armrests are of a different construction. For example, molded foam is substituted for the padding and upholstery.

Figure 12:
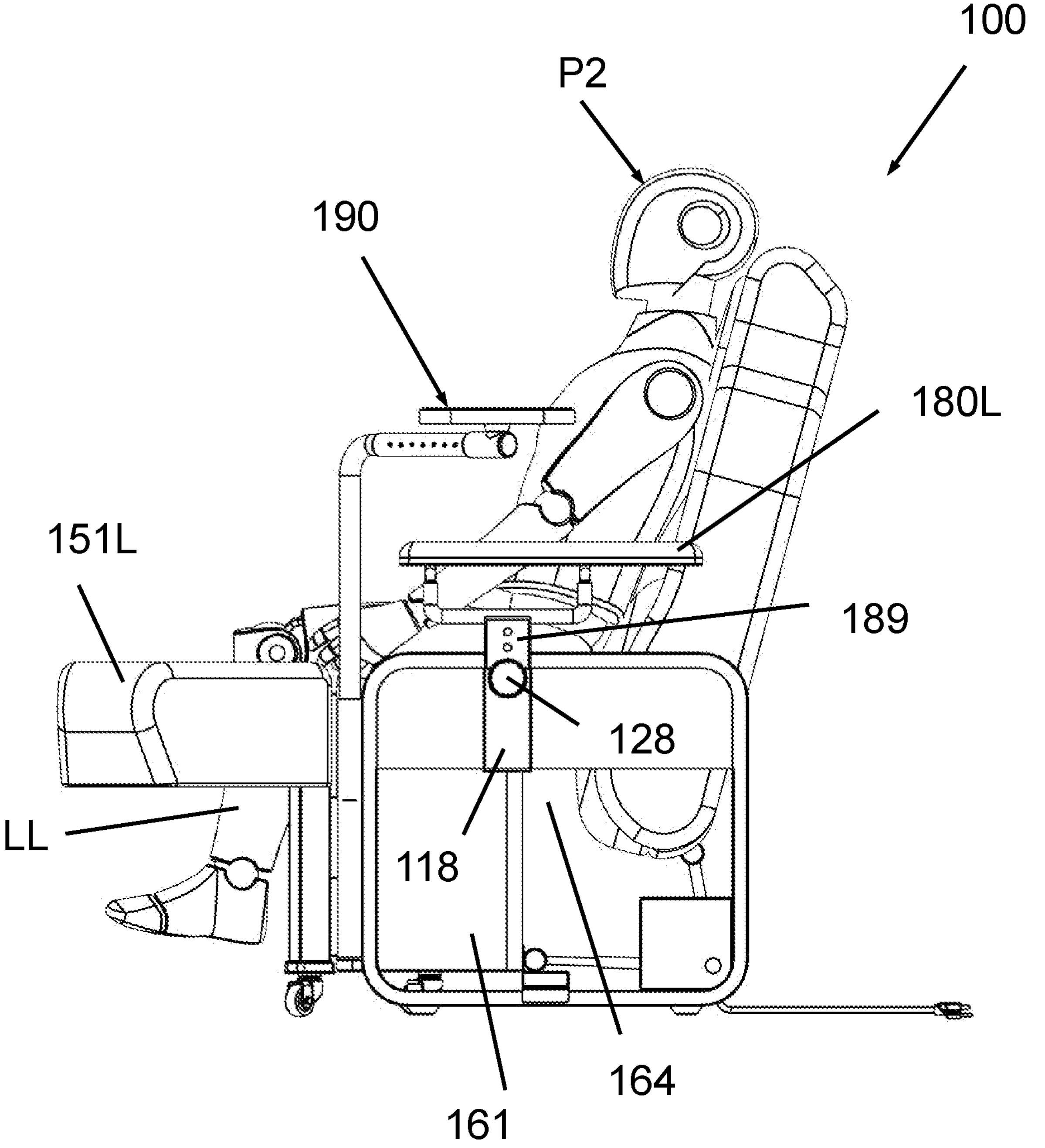
FIG. 12 is a left side view of the tall person and the apparatus of FIG. 10.

To support the armrests 180L and 180R, the frame 110 includes respective left and right frame brackets 118 that define vertically extending openings or channels to slidably and/or telescopically receive respective left and right arm brackets 189 (see FIG. 12). Each arm bracket 189 includes a vertical tube or post that nests inside a respective frame bracket 118, and a U-shaped tubular member rigidly connected to an upper end of a respective post (via welding, for example). Each tubular member defines rearward and forward upwardly opening vertical receptacles to rotatably receive the lower ends of respective rearward and forward crank bars 183 and 184 (see FIGS. 16-17). The opposite, upper ends of the crank bars 183 and 184 are rotatably mounted to respective rearward and forward portions of respective armrests 180L and 180R.

Figure 7:
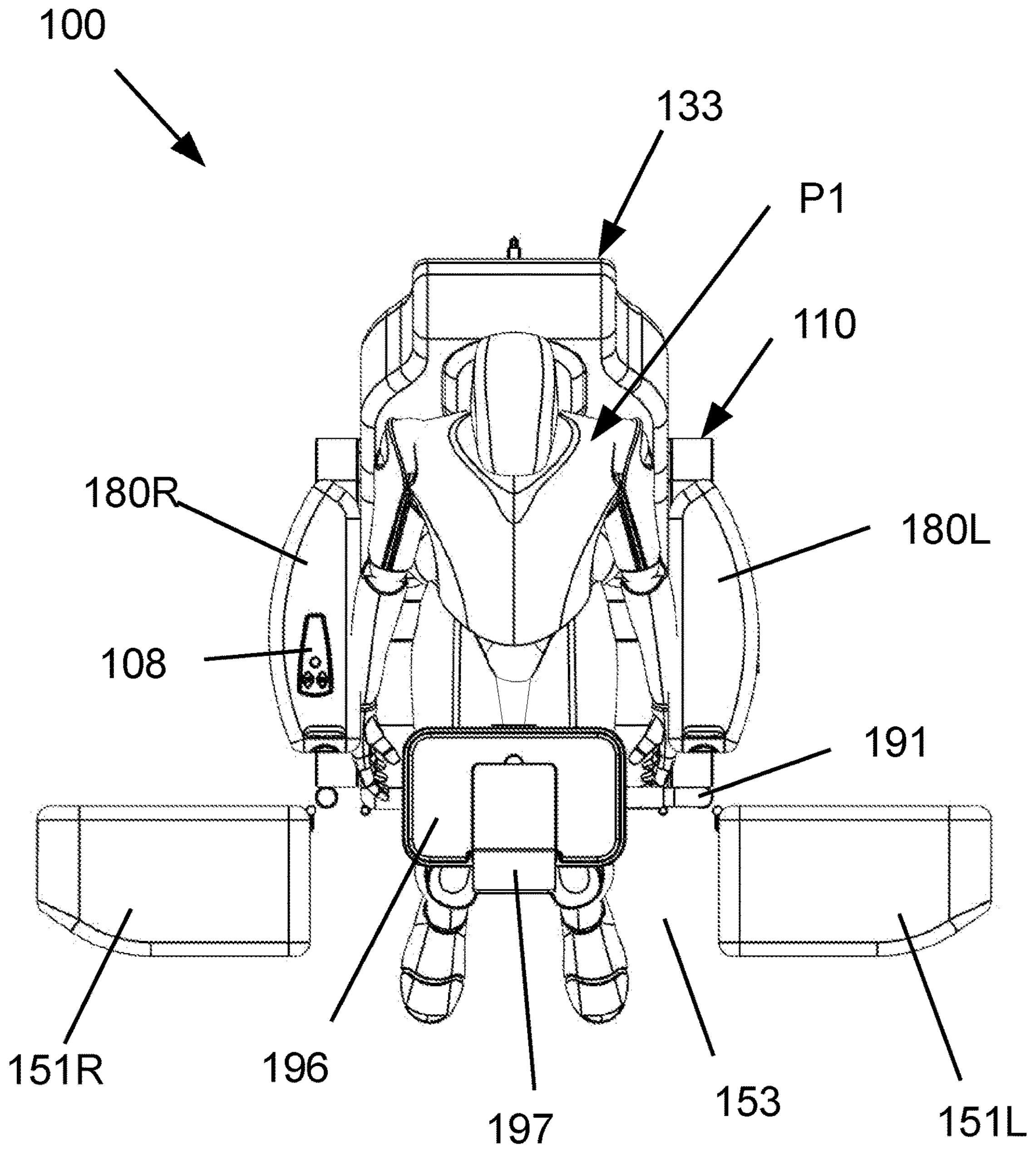
FIG. 7 a top view of the tall person of FIG. 6 occupying a seated position on the apparatus of FIG. 6, but with the apparatus arranged in a third configuration.

On each side of the apparatus 100, a spring-loaded knob 128 (or any other suitable conventional fastener) inserts through a hole in the frame bracket 118 and any one of several holes in the arm bracket 189 that are movable into alignment with the hole in the frame bracket 118. In this manner, each arm bracket 189 is selectively adjustable vertically relative to the frame 110. For example, FIGS. 3-4 show the arm brackets 189 (and armrests 181L and 181R) adjusted to and/or positioned at a relative low elevation, and FIG. 7 shows the arm brackets 189 (and armrests 181L and 181R) adjusted to and/or positioned at a relative high elevation.

As shown in FIG. 17, the armrest 180L includes an upwardly facing surface configured and arranged to comfortably underlie a person's lower arm. At the front of the armrest 180L, a plunger or button 188 is movably mounted inside and operatively connected to the internal structure 182 of the armrest 180L. The button 188 is rigidly connected to a latch 185 that defines a variable width slot 186. A helical spring 187 (shown diagrammatically) is compressed between the latch 185 and a wall defined by the internal structure 182 inside the armrest 180L. The internal structure 182 of the armrest 180L also defines a cylindrical opening to accommodate the spring 187, and a channel to accommodate movement of the latch 185 toward the wall. The latch channel and the spring opening intersect one another, and the vertically measured depth of the channel is less than the diameter of the opening.

Proximate the button 188, the slot 186 in the latch 185 has parallel and opposing first walls that define a relatively larger slot width. Proximate the spring 187, the slot 186 has parallel and opposing second walls that define a relatively smaller slot width. The crank bar 184 has a segment that occupies the slot 186, and this segment has a perimeter that is preferably a regular octagon with four sets of opposite, parallel sides. On some alternative embodiments, this segment defines other shapes, including a square, for example. In any event, the relative sizes of the crank bar segment and the slot 186 are such that the crank bar segment is free to rotate inside the wider section of the slot 186, but is latched or locked against rotation when occupying the narrower section of the slot 186. FIG. 17 shows the crank bar 184 in the latched state with the second walls of the latch 185 very close to diametrically opposite parallel walls on the octagonal segment. The spring 187 biases the latch 185 toward this state or position and/or resists movement of the latch 185 away from this position.

Figure 8:
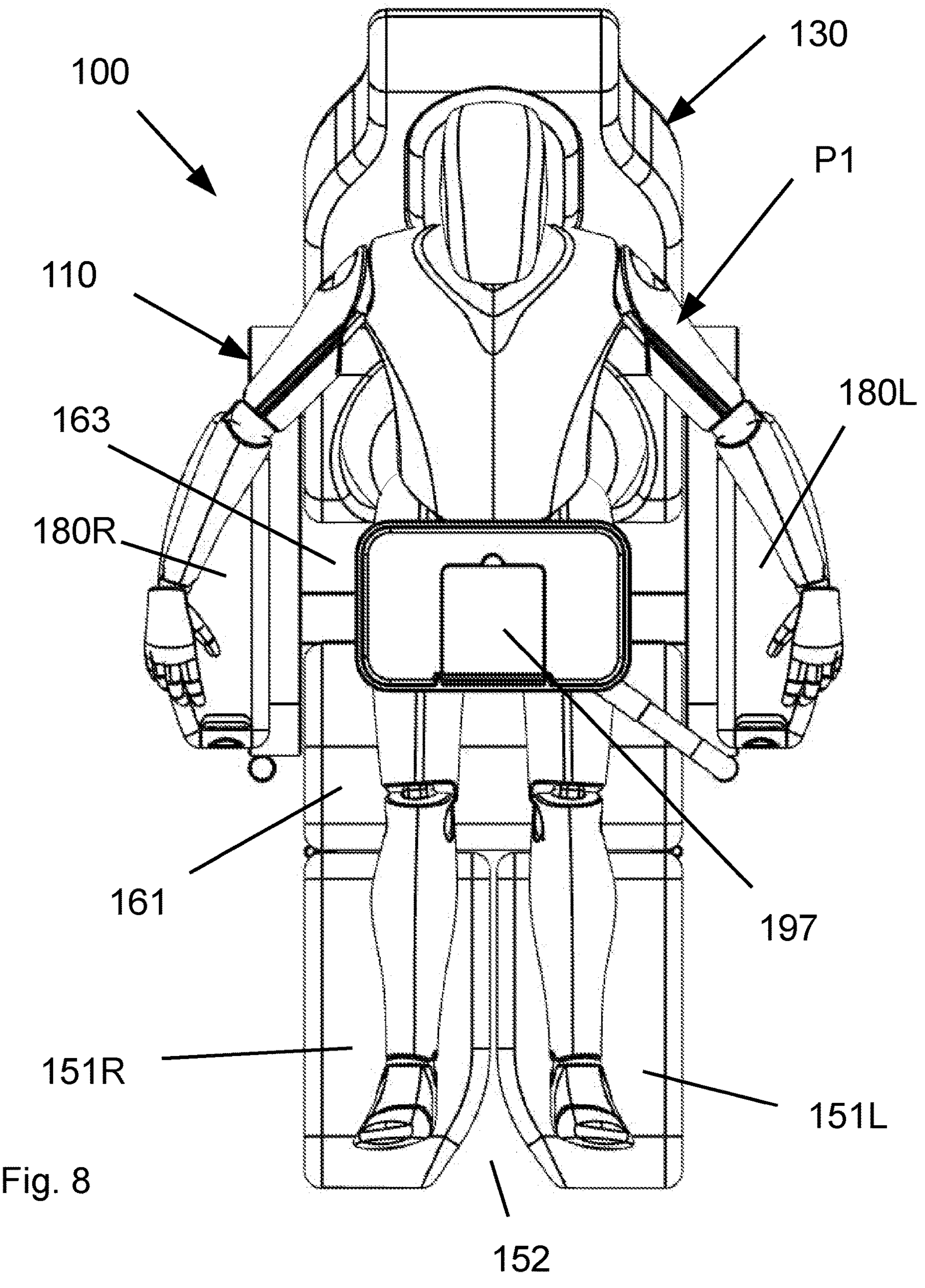
FIG. 8 is a top view of the tall person of FIG. 7 occupying a seated position on the chair of FIG. 7, but with the apparatus arranged in a fourth configuration.
Figure 13:
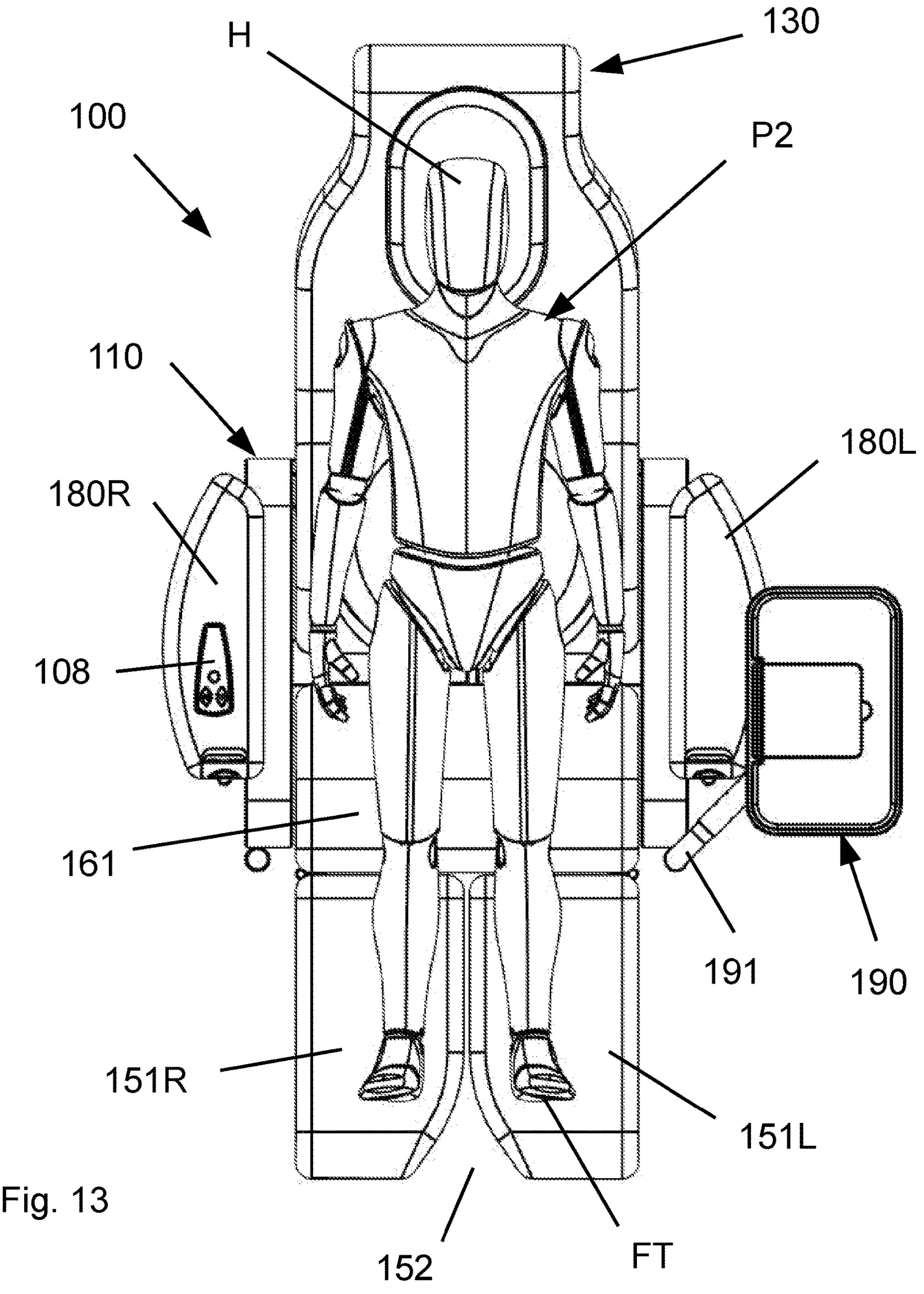
FIG. 13 is a top view of a relatively short person occupying the apparatus of FIG. 1, but with the apparatus arranged in a sixth configuration.

The bias of the spring 187 may be overcome by sufficient user force exerted against the button 188. Sufficient depression of the button 188 will move the wider part of the slot 186 into alignment with the octagonal segment, thereby freeing the crank bar 184 for rotation relative to the internal structure 182 of the armrest 180L. FIG. 2 shows the armrests 180L and 18CR latched in relatively outboard locations relative to the frame 110. FIG. 7 shows the armrests 180L and 18CR latched in relatively inboard locations relative to the frame 110. FIG. 8 shows the armrests 180L and 18CR latched in relatively forward locations relative to the frame 110. FIG. 13 shows the armrests 180L and 18CR latched in relatively rearward locations relative to the frame 110.

FIG. 5 shows the apparatus 100 in a configuration with the forward leg supports 151L and 151R pivoted away from one another and a tray table 190 (described below in more detail) pivoted over to the left side of the apparatus 100. In this second configuration, a relatively larger gap 153 is defined between the forward leg supports 151L and 151R, entirely exposing a front face 163 on the rearward leg support 161. In other words, this second configuration provides direct and unencumbered access to the rearward leg support 161. In a manner known in the art, torsion springs are preferably operatively connected to and/or incorporated onto the hinges 160 to bias the lower leg supports 151L and 151R away from the positions shown in FIG. 5 and toward the positions shown in FIG. 1. As compared to FIGS. 1-4, which show the back support 130 at an angle of forty-five degrees from vertical, FIG. 5 shows the back support 130 at an angle of thirty degrees from vertical.

Figure 6:
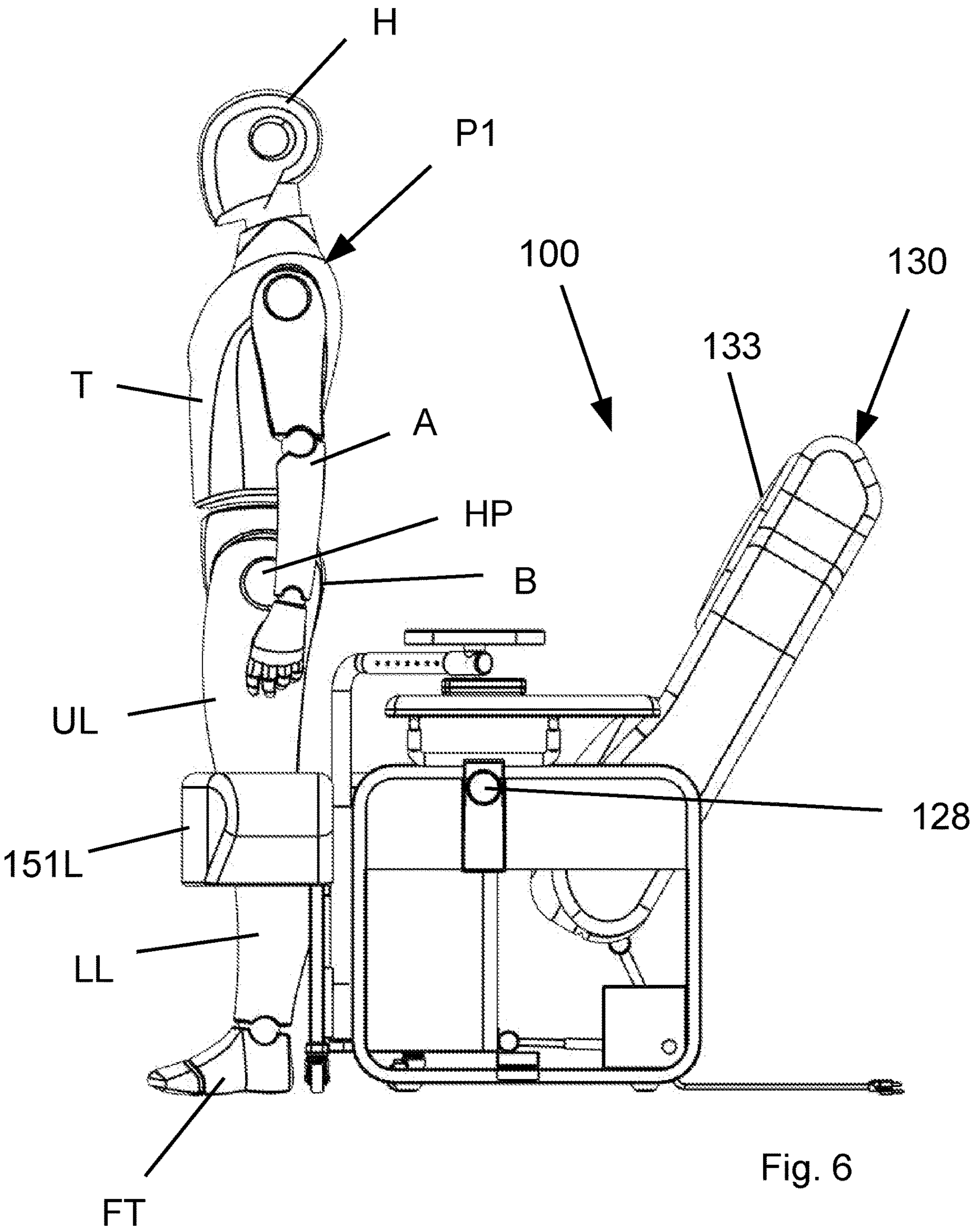
FIG. 6 is a left side view of a relatively tall person standing in front of the apparatus of FIG. 5.

FIG. 6 shows a relatively tall person P1 standing just in front of the front face 163 of the rearward leg support 161, in the gap 153 defined between the forward leg supports 151L and 151R, and facing forward away from the apparatus 100. The person P1 is seventy-five inches tall, as measured from the bottom of his feet FT to the top of his head HD. Among other things, the person P1 may be described as having a torso T, left and right arms A, left and right hips HP, a derriere or buttocks B, left and right thighs or upper legs UL, left and right knees (hidden in this view but designated as K in another view), and left and right lower legs LL. In FIG. 6, the position of the person P1 is consistent with either preparing to mount or sit down on the apparatus 100, or having just dismounted or arisen from the apparatus 100.

FIGS. 7-8 show the person P1 occupying and/or sitting on the apparatus 100. To illustrate additional features of the apparatus 100, FIG. 7 shows a third configuration of the apparatus 100. The tray table 190 is moved to a position above the person's thighs UL, and the tray table 190 has its back stop 197 deployed to support a book or tablet, for example. In a manner known in the art, the back stop 197 is a rigid panel that is pivotally connected to the main work surface component 196 for pivoting between the deployed orientation shown in FIG. 7, and the stowed orientation shown in FIG. 8. When stowed, the back stop 197 nests flush within the main work surface component 196 to define a continuous rigid support surface.

Figure 9:
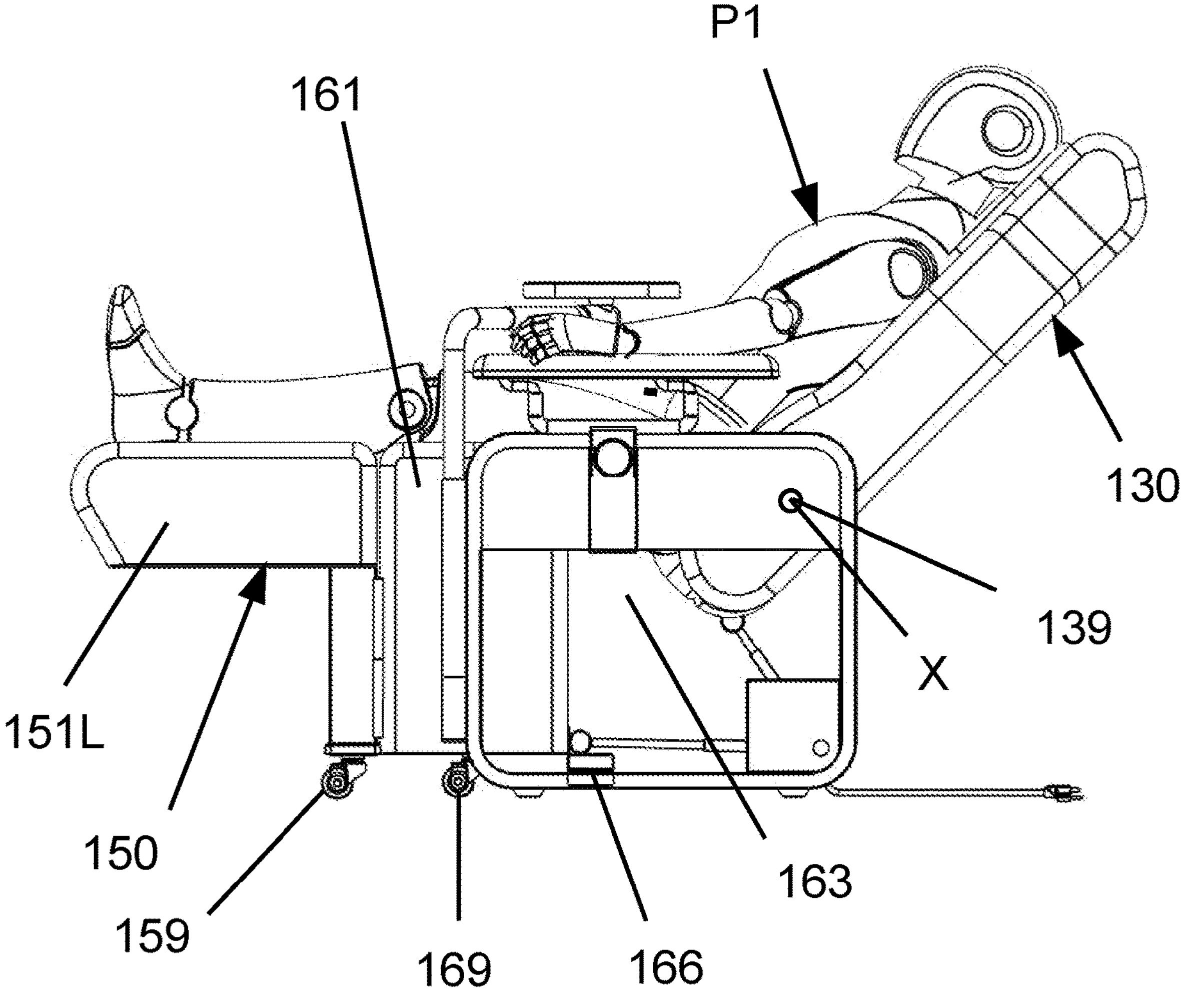
FIG. 9 is a left side view of the tall person and the apparatus of FIG. 8.

FIGS. 8-9 show a fourth configuration of the apparatus 100. The tray table 190 is pivoted to a more rearward position, and the tray table back stop 197 occupies its stowed orientation. Also, the forward leg supports 151L and 151R are pivoted together to underlie the person's lower legs. As compared to FIGS. 5-7, which show the back support 130 at an angle of thirty degrees from vertical, FIGS. 8-9 show the back support 130 at an angle of forty-five degrees from vertical. As compared to FIG. 7, which shows the armrests 180L and 18CR adjusted to their most inward positions relatively proximate one another, FIGS. 8-9 show the armrests 180L and 18CR adjusted to their most forward positions relative to the frame 110. As compared to all of the earlier Figures, FIGS. 8-9 show the entire leg support 150 adjusted forward relative to the frame 110, creating a relatively larger void or gap 163 between the back of the leg support and the proximate portion of the bladder 140.

Figure 10:
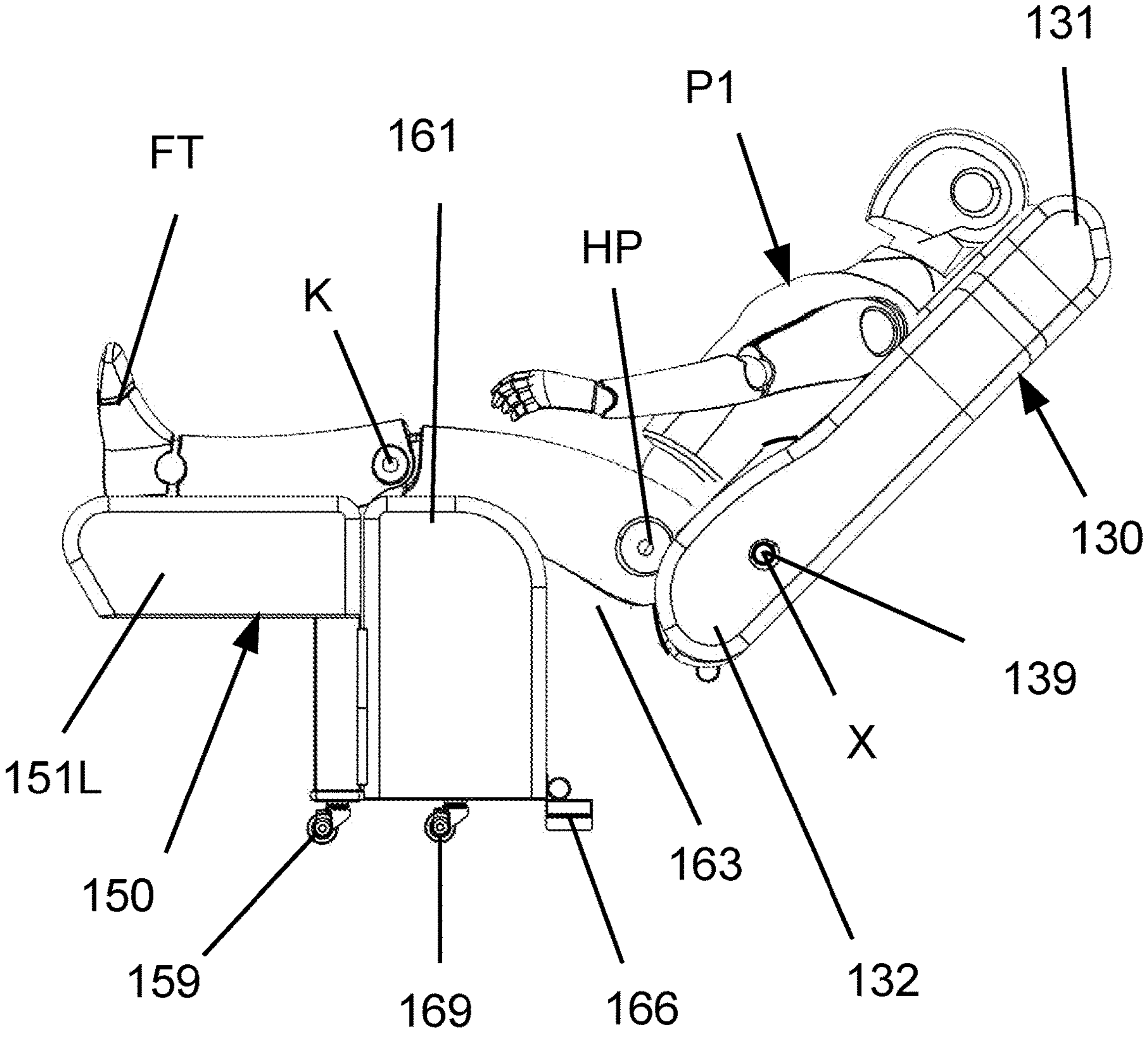
FIG. 10 is the same left side view of the tall person and the apparatus of FIG. 9, but with certain features of the apparatus removed to better illustrate other features.

FIG. 10 shows the person P1 relative to just the body supporting elements of the apparatus 100 as configured and arranged in FIG. 8-9. The person P1 is occupying one of several desirable positions on the apparatus 100, which may be described as a sunken or suspended seated position with his hips HP below both his feet FT and his knees K, and nothing underlying his buttocks B. In other words, his hips HP and his buttocks B occupy the gap 163 defined between opposing portions of the bladder 140 and the upper leg support 161 (beneath all of the contact points between the person P1 and the apparatus 100). The person's lower back is pressed against and into the proximate portion of the bladder 140, and portions of his upper legs UL and his lower legs LL are engaged by the cushioned portions of the leg support 150.

The person P1 may find it desirable to vary his position in several different ways. For example, the person P1 can (1) lower his hips HP and his buttocks B deeper into the gap 163 by sinking further down between the bladder 140 and the upper leg support 161 (at an extreme position, his knees K will bend about the rounded back edge of the upper leg support 161, and his upper legs UL and torso T will define an acute angle or V-shape); (2) move the foot support 150 forward or backward relative to the upper body support 130; and/or (3) pivot the upper body support 130 to be relatively more or less inclined relative to the floor surface F. Any combination of the latter two adjustments may be made on a continual reciprocal basis to create a massaging effect (like a rocking chair, for example, but gently squeezing and releasing the persons' lower back and upper legs UL).

It has been discovered that positions within this range of sunken seated positions prevent and/or relieve back pain for certain individuals with back problems, and/or allow certain individuals with back problems to sit more comfortably than they otherwise could. In other words, some people experience back pain when sitting on a conventional chair, sofa, and/or automobile seat, and/or after arising from these sorts of conventional seated positions, and at least some of these people experience no such back pain while sitting as shown in FIG. 10 and/or after arising from the seated position shown in FIG. 10. In addition, some people have successfully self-massaged their troubled lower backs by moving the leg support 150 back and forth and/or pivoting the upper body support 130 between more and less inclined orientations in a manner that moves their body through a range of seated positions, which can include the seated position shown in FIG. 10. In other words, contrary to a vibratory massage device that repeatedly pulses against a person occupying a particularly body position, the massage effect provided by the subject invention moves a person through a range of body positions and effectively manipulates a person's lower back, including the lumbar region.

As shown in FIG. 4, the apparatus 100 includes a first linear actuator 103 operatively interconnected between the upper body support 130 and a control unit 101 mounted on a lower rear portion of the frame 110. The actuator 103 may also be described as a reorienting means for selectively reorienting the backrest 130 relative to the frame 110. Similarly, a second linear actuator 105 is operatively interconnected between the leg support 150 and the control unit 101. The actuator 105 may also be described as a repositioning means for selectively repositioning the leg rest relative to the frame. Persons skilled in the art will recognize that various other known devices, such as stepper motors and lead screws, may be used to perform these functions.

In a manner known in the art, power is supplied to each actuator 103 and 105 via the control unit 101 and a conventional power source, including an electrical cord extending between the control unit 101 and an electric wall socket, for example. On some embodiments, a separate controller is operatively connected to each actuator 103 and 105 via a respective cord. As shown in FIG. 5, the apparatus 100 includes a battery powered remote controller 108 that is operatively connected to both of the actuators 103 and 105 via a wireless connection to the control unit 101. In addition to signaling the actuator 103 and/or the actuator 105 to expand or contract, the controller 108 may be used to run programs that make various pre-programmed adjustments to the back support 130 and/or the leg support 150, including massage sessions based on factory programming and/or user-supplied input (e.g. see some of the patents incorporated by reference).

One desirable and exemplary control program involves the steps of (1) providing power; (2) pivoting the upper body support 130 to a maximum desirable reclined orientation; (3) signaling to the control program that the upper body support 130 currently occupies the maximum desirable reclined orientation; (4) pivoting the upper body support 130 to a maximum desirable upright orientation; (5) signaling to the control program that the upper body support 130 currently occupies the maximum desirable upright orientation; (6) signaling to the control program to begin cycling the upper body support 130 through a range of orientations between the maximum and minimum orientations. Depending on user preference, an additional series of steps may be performed by (A) moving the leg rest 150 to a maximum desirable distance from the pivot axis X; (B) signaling to the control program that the leg rest 150 currently occupies the maximum desirable distance from the pivot axis X; (C) moving the leg rest 150 to a minimum desirable distance from the pivot axis X; (D) signaling to the control program that the leg rest 150 currently occupies the minimum desirable distance from the pivot axis X; and (E) signaling to the control program to begin cycling the leg rest 150 through a range of positions between the maximum and minimum distances from the pivot axis X. Steps (6) and (E) may be performed separately or successively or contemporaneously.

It has also been discovered that a person can engage and exercise his abdominal muscles by holding himself in a fixed position while performing step (6), which may be performed either as described above or manually using the remote controller 108. In other words, if done with the remote controller 108, a person can sit in a chair and exercise his abs without moving due to the redistribution on how his weight is supported as the upper body support 130 changes orientation.

Figure 11:
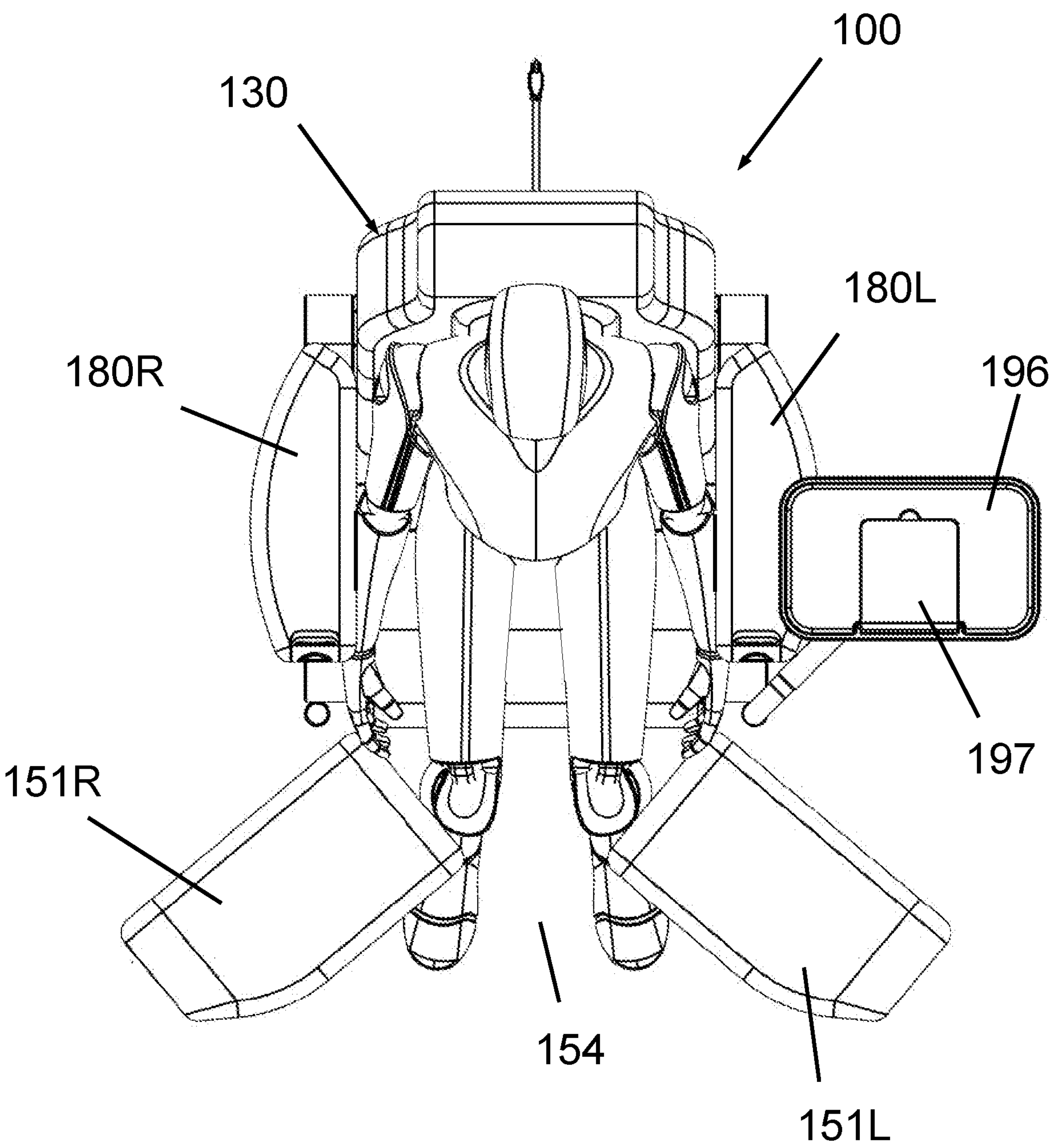
FIG. 11 is a top view of the tall person of FIG. 7 occupying a seated position on the apparatus of FIG. 7, but with the apparatus arranged in a fifth configuration.

FIGS. 11-12 show the person P1 occupying a relatively more upright and conventional seated position. The apparatus 100 is arranged in more of an upright chair configuration with the back support 130 at an angle of 10 degrees from vertical, and the leg supporting assembly 150 retracted to its most rearward position relative to the frame 110. As the upper body support 130 approaches vertical, the distance between the lower end 132 and the floor F is approximately 10 inches (which may alternatively be described as less than 12 inches and/or in the range of 2 to 12 inches). Even in this configuration, a gap of several inches is still defined between the rearward leg support 161 and the lower back support 140. FIG. 11 also illustrates the spring bias acting on the hinges 160 to encourage the forward leg supports 151L and 151R toward one another (and into the person's lower legs LL), thereby defining an intermediate sized gap 154 between the forward leg supports 151L and 151R. Starting from a position along the lines shown in FIG. 8, the person P1 arrives at this situation in FIG. 11 by first lowering or pressing one or both feet FT into the gap 152 between the forward leg supports 151L and 151R. The weight of the person's feet and/or lower legs is sufficient to overcome the spring bias acting on the hinges 160 and to spread the forward leg supports 151L and 151R apart from one another. Then the person P1 may dismount the apparatus 100 and return to the standing position shown in FIG. 6.

As compared to the previous Figures, FIG. 12 shows both the tray table 190 and the armrests 180L and 18CR raised to relatively higher elevations. These elevations are more suitable for the person's more upright sitting position, and the person P1 may find the higher armrests 180L and 18CR desirable for purposes of pushing himself up and out of the apparatus 100.

The tray table 190 is slidably mounted on the horizontal segment of an L-shaped tubular member 191. In a manner known in the art, the main body 196 of the tray table 190 is secured to a sleeve, which in turn, is disposed about and slides along the horizontal member. A conventional fastener, such as a detent pin, inserts through a hole in the sleeve and any one of several holes in the horizontal member to latch or secure the sleeve in place on the horizontal member. In a manner known in the art, the L-shaped tubular member 191 has a vertical segment that is slidably mounted inside one of two support tubes 119 on respective sides of the frame 110. The Figures show the vertical segment installed on the left side with the understanding that it could alternatively be installed on the right side. In either case, another suitable conventional fastener is inserted through a hole in the support tube directly beneath the lower end of the vertical member to hold or secure the tubular member 191 at a desired elevation inside the support tube 119. The components described in this paragraph may alternatively be described as a tray table and a connecting means for connecting the tray table to the frame for selective relocation in three orthogonal directions.

Figure 14:
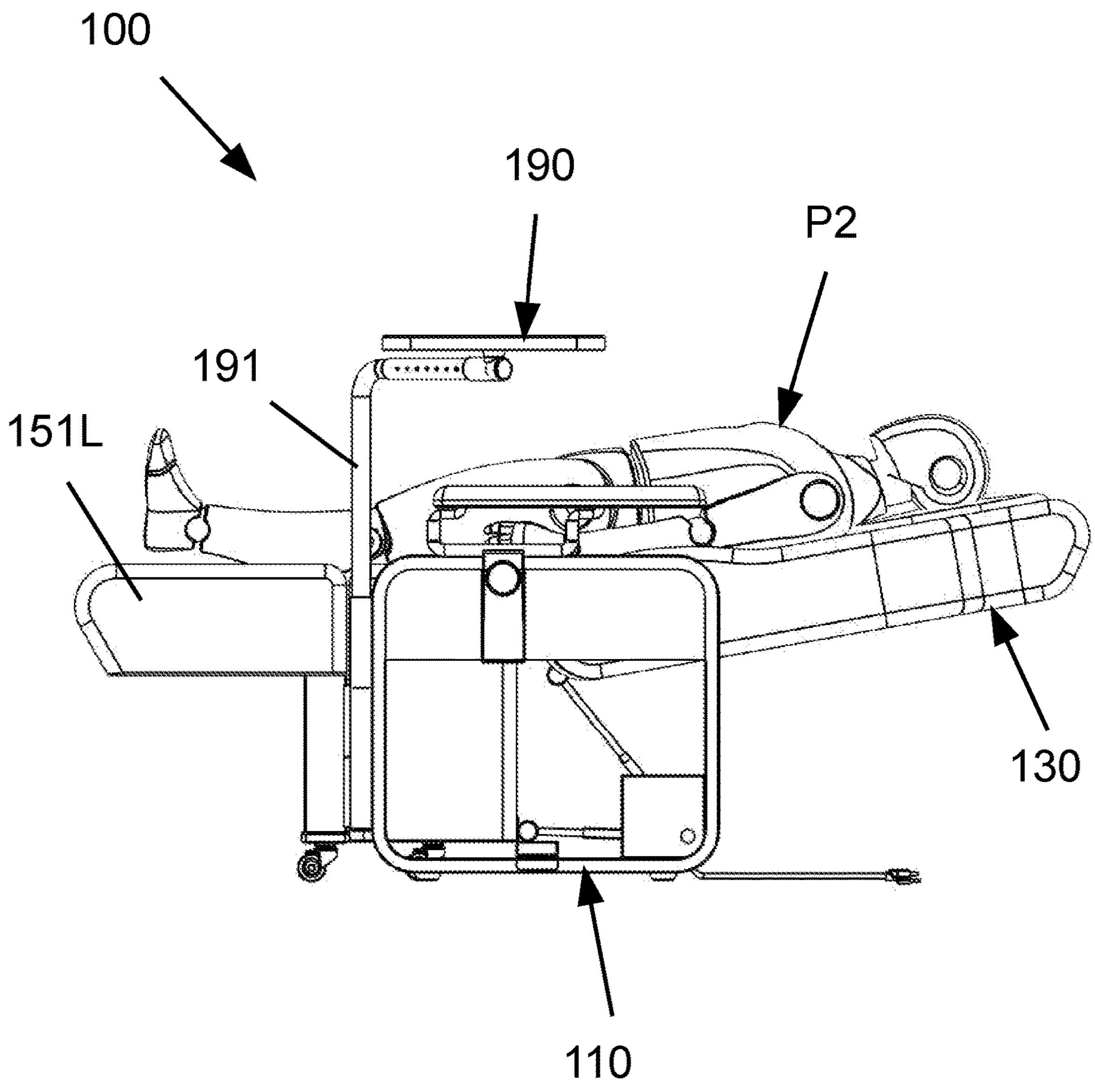
FIG. 14 is a left side view of the short person and the apparatus of FIG. 13.
Figure 15:
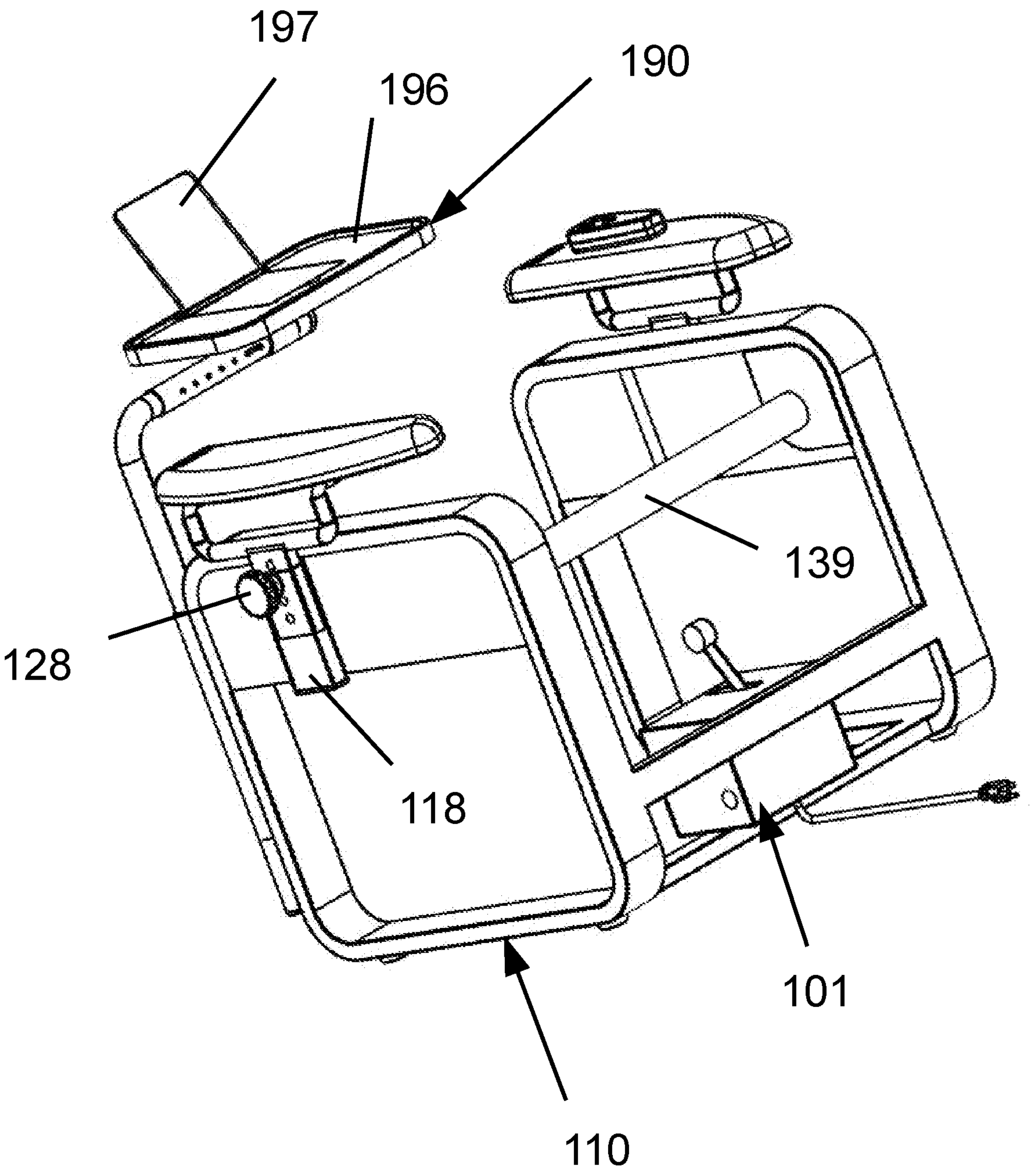
FIG. 15 is an alternative perspective view of components of the apparatus of FIG. 1, with the body supporting elements removed to better illustrate other features.

To provide additional context for the present invention, FIGS. 13-14 show a second, relatively short person P2 occupying the apparatus 100, which is arranged in a sixth configuration. The person P2 may be described in terms of all the same body parts as the person P1. The person P2 is sixty-three inches tall, as measured from the bottom of her feet FT to the top of her head HD. In this sixth configuration, the back support 130 is pivoted to a mostly reclined position (eighty degrees from vertical). As the upper body support 130 approaches horizontal, the distance between the lower end 132 and the floor F is approximately 15 inches (which may alternatively be described as at least 10 inches and/or in the range of 10 to 18 inches). Also, when the upper body support 130 occupies a horizontal orientation, the bladder 140 must be underinflated (less than 0.6 psi) to be flush with a top surface of the leg rest 150.

Figure 18A:
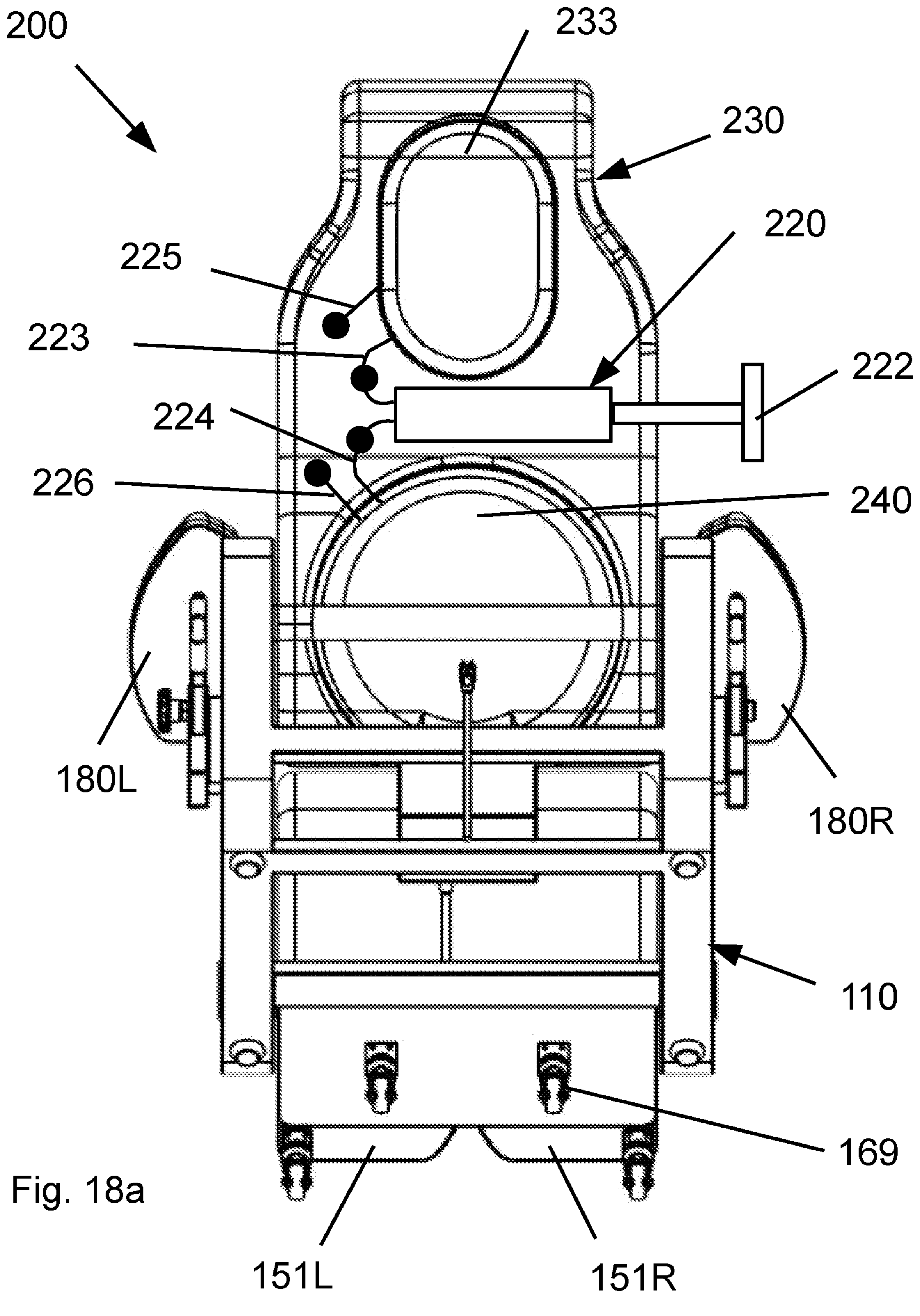
FIG. 18*a* is a mostly bottom perspective view of a second apparatus constructed according to the principles of the present invention.

FIG. 18*a* shows an alternative embodiment apparatus 200 constructed according to the principles of the subject invention. The apparatus 200 may be described as identical to the apparatus 100, except for the substitution of back support 230 for back support 130. In FIG. 18*a*, certain elements of the back support 230 are shown as transparent for ease of illustration and discussion. All features of the back support 130 are present on the back support 230. In addition, the back support 230 includes integrated adjusting means for adjusting pressure inside the head engaging bladder 233 and/or the back engaging bladder 240. In this regard, the bladders 233 and 240 are operatively connected to a manually operated pump 220 that works in the same manner as a conventional bicycle tire pump. Among other things, the pump 220 includes a T-shaped plunger 222 that pumps or pushes air into the main body of the pump 220.

The head engaging bladder 233 is identical to the head support 133, except that first and second hoses 223 and 225 are operatively connected to the bladder 233. The first hose 223 extends between the bladder 233 and the pump 220 and includes a valve disposed in series between the bladder 233 and the pump 220 to selectively place the bladder 233 in fluid communication with the pump 220. The second hose 225 terminates in a valve that is selectively opened to place the bladder 233 in fluid communication with the surrounding atmosphere. Similarly, the back supporting bladder 240 is identical to the bladder 140, except that first and second hoses 224 and 226 are operatively connected to the bladder 240. The first hose 224 extends between the bladder 240 and the pump 220 and includes a valve disposed in series between the bladder 240 and the pump 220 to selectively place the bladder 240 in fluid communication with the pump 220. The second hose 226 terminates in a valve that is selectively opened to place the bladder 240 in fluid communication with the surrounding atmosphere. In a manner known in the art, the first valves 223 and 224 are operable to selectively add air or increase pressure in any combination of the bladders 233 and 240 in response to operation of the pump 220. In a manner known in the art, the second valves 225 and 226 are operable to selectively remove air or decrease pressure in the respective bladders 233 and 240 independent of one another.

On some alternative embodiments, the head engaging bladder 233 is repurposed and repositioned to instead function as a submerged or inaccessible reservoir bladder that is connected to the back engaging bladder via a hose and an intermediate valve operatively connected to the hose. The reservoir bladder is disposed inside the upper body support and is accessible from the back side of the upper body support (as opposed to the front side) for a user to adjust pressure between the two bladders by exerting pressure against whichever bladder is to be deflated. In other words, the two bladders form a closed system, and air simply travels between them.

On other alternative embodiments, the pump 220 is separate from the apparatus 100 and connected to the first hoses 223 and 224 via a relatively longer hose. On other alternative embodiments, the pump 220 is replaced by a third, separate bladder that holds a reserve supply of air or other gas to alternatively deliver and receive gas from the bladder 233 and/or the bladder 240 (in response to a compressive force acting on the "delivering" bladder, for example). On other alternative embodiments, the pump 220 is replaced by an electric compressor that maintains a desired pressure inside one or both of the bladders 233 and 240 (in response to a control program and/or a user operated controller, for example).

Figure 18B:
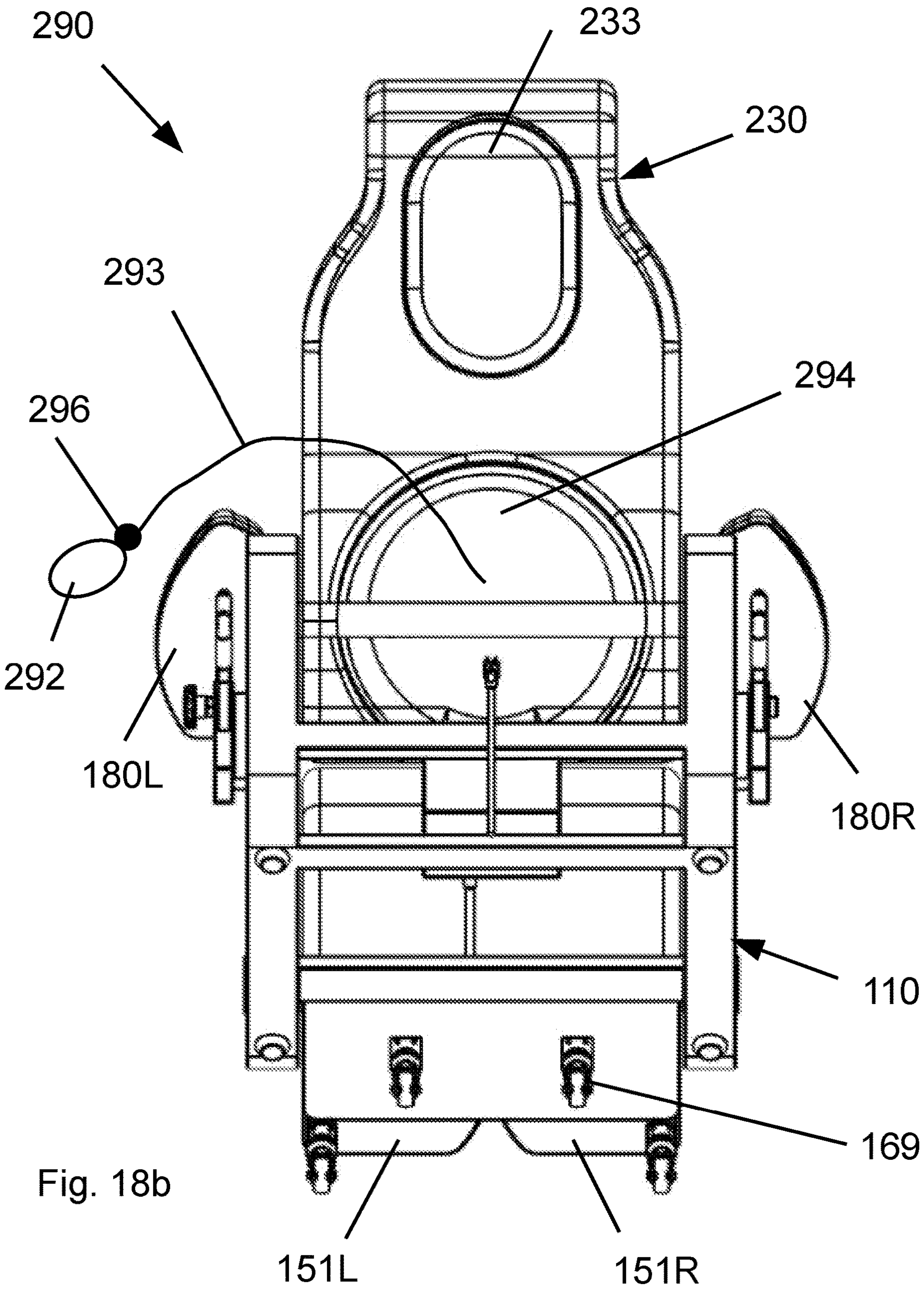
FIG. 18*b* is a mostly bottom perspective view of a third apparatus constructed according to the principles of the present invention.

FIG. 18*b* shows yet another alternative embodiment 290 that uses elements of a conventional sphygmomanometer (e.g. see some of the patents incorporated by reference) to selectively adjust pressure in the lumbar engaging bladder 294. In this regard, a hose 293 is operatively interconnected between the bladder 294 and a compressible bulb 292, and a valve 296 is operatively connected to at least one of the bulb 292, the hose 293, and the bladder 294. The hose 293 is sufficiently long and flexible to put both the bulb 292 and the valve 296 conveniently within reach of a person resting on the apparatus 290. A person squeezes the bulb 292 to increase pressure in the bladder 294, and operates the valve 296 (and may exert pressure against the bladder 294) to decrease pressure in the bladder 294. A similar arrangement may be used in connection with the head engaging bladder, as well.

One anticipated use of any of the foregoing pump arrangements or bladder pressure adjusting means is to switch between relatively more pressure in the back engaging bladder 240 when the back support 230 is closer to vertical, and to relatively less pressure in the back engaging bladder 240 when the back support 230 is closer to horizontal. In this regard, a relatively flatter lumbar engaging bladder is more comfortable (and stabilizing) when a person is lying directly on top of it. On some alternative embodiments, a controller may be programmed to automatically adjust pressure in the bladder 240 as a function of the orientation of the back support 230. In any event, the pressure inside the bladder 240 (and/or the bladder 140) is believed to be an important factor to user comfort. Among other things, a less than fully inflated bladder (under 0.9 psi) seems to gently and thoroughly conform to a person's lower back in a way that provides comfort and/or relief from lower back pain.

Figure 19:
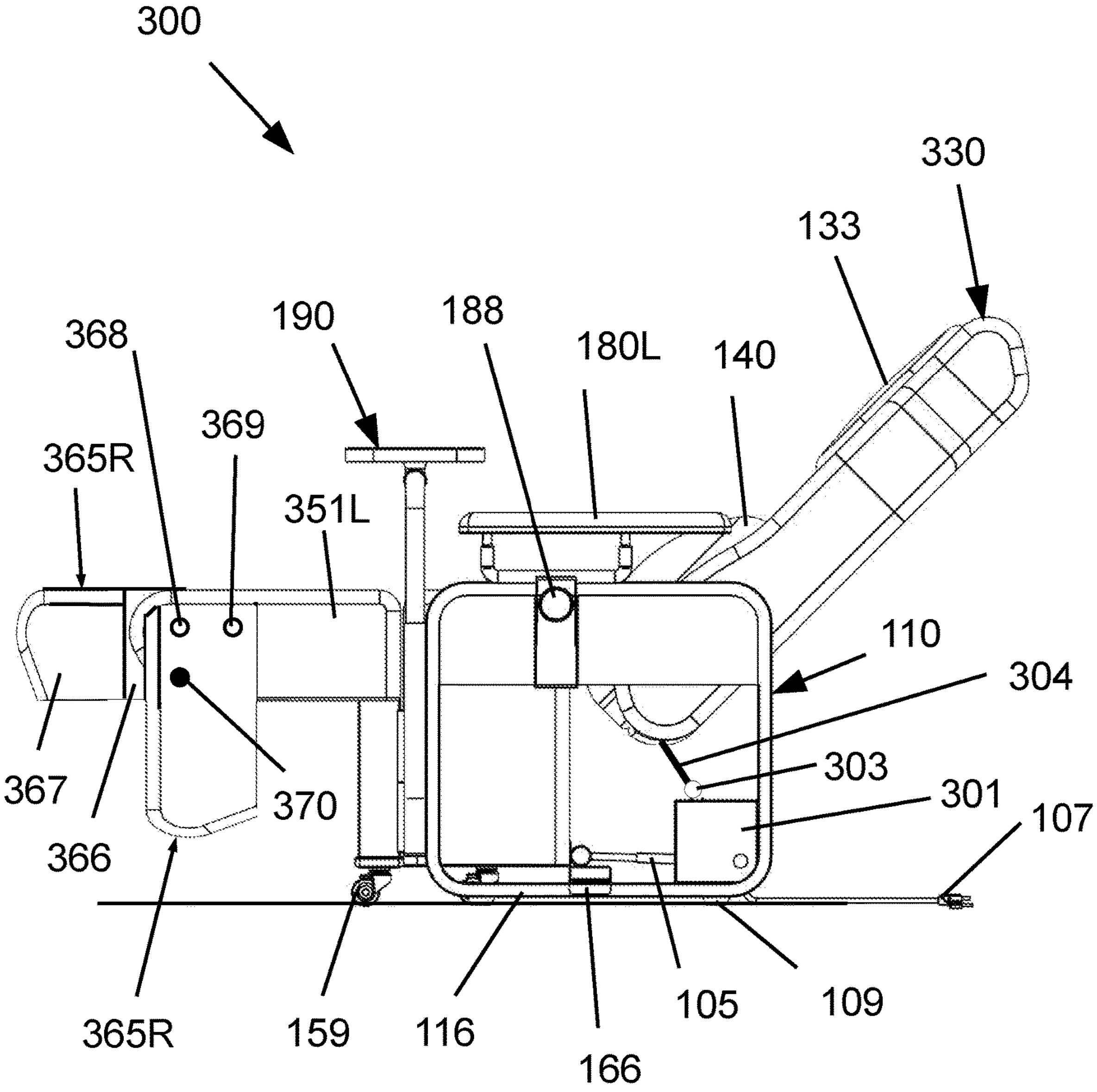
FIG. 19 is a left side view of a fourth apparatus constructed according to the principles of the present invention.

FIG. 19 shows another alternative embodiment apparatus 300 constructed according to the principles of the subject invention. The apparatus 300 may be described as identical to the apparatus 100, except for (a) the substitution of a different mechanism for affecting the orientation of the back support 330; and (b) modified left and right forward leg supports 351L and 351R.

With respect to the upper body support 330, a conventional nylon strap 304 extends in series between the bottom end of the upper body support 330 and the distal end of a relatively shorter linear actuator 303. The strap 304 cooperates with the linear actuator 303 to limit forward/upward pivoting of the bottom end of the upper body support 330, as well as rearward/downward pivoting of the head end of the upper body support 330. However, the strap 304 accommodates pivoting of the upper body support 330 in the opposite direction (i.e. counter-clockwise pivoting in FIG. 19). As a result, a person can set a limit on reclining (toward horizontal) and then rock backward up to that limit and then forward again (toward vertical), thereby manually performing a relaxing rocking motion and/or a self-massage on the lower lumbar region.

With respect to the forward leg supports 351L and 351R, they are mirror images of each other and they increase the capacity of the apparatus 100 in terms of a person's height or length. In this regard, extensions 365L and 365R are pivotally mounted on respective forward leg supports 351L and 351R for pivoting about respective pivots axes 368. Each extension 365L and 365R includes a outboard plate 366 and a cushioned and upholstered block 367. In FIG. 19, the block 367 on the left leg support 351L is pivoted to a stowed position, disposed beneath the left leg support 351L, and the block 367 on the right leg support 351R is pivoted to a deployed position, extending forward of the right leg support 351R and extending the associated upwardly facing leg supporting surface. Each extension 365L and 365R is secured in each position by a respective rod or other fastener 370 inserted through a respective hole 369 in a respective plate 366 and an aligned hole in a respective leg support 351L or 351R.

Figure 20:
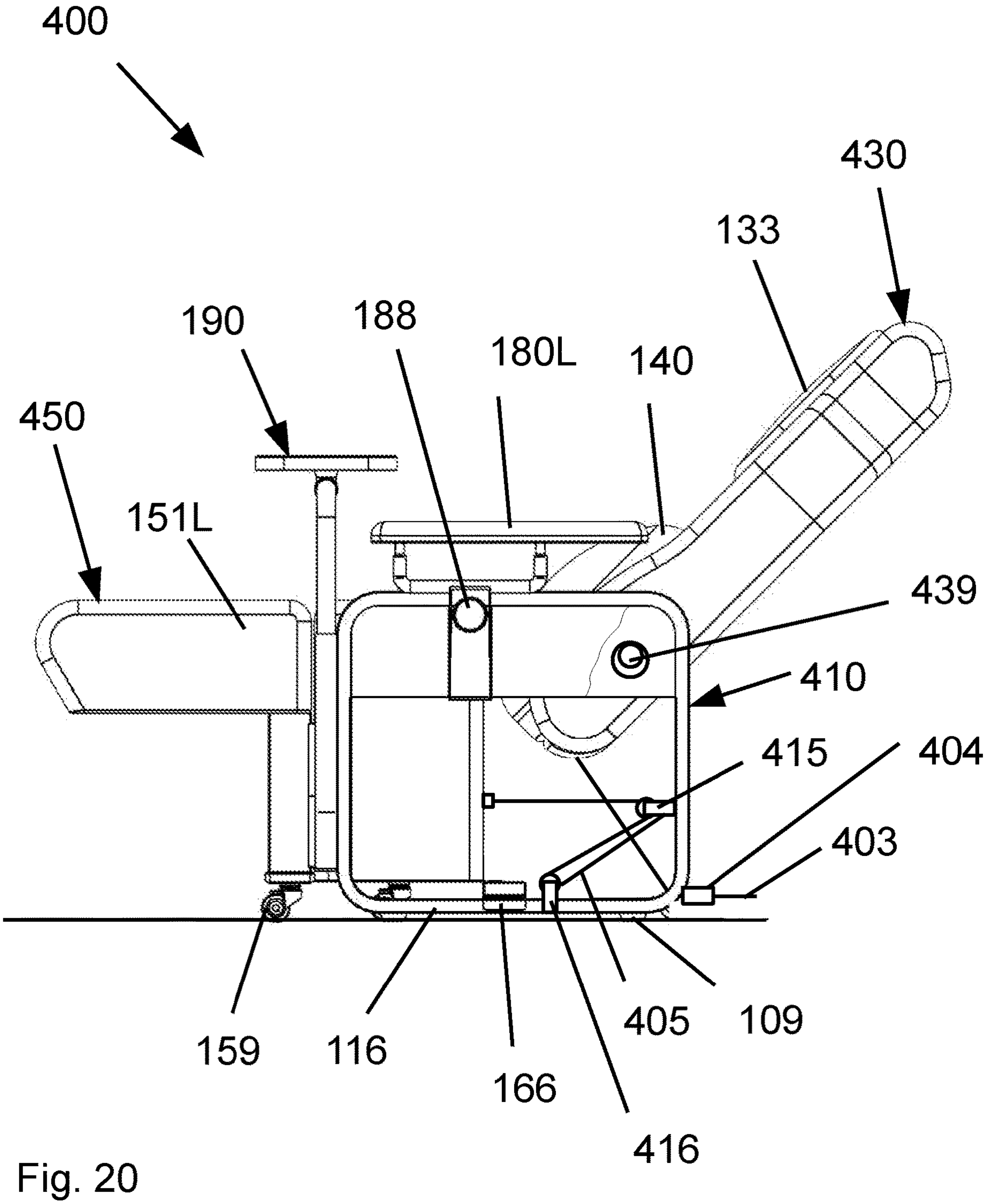
FIG. 20 is a left side view of a fifth apparatus constructed according to the principles of the present invention.

FIG. 20 shows yet another apparatus 400 constructed according to the principles of the subject invention. The apparatus 400 may be described as identical to the apparatus 100, except for the substitution of different mechanisms for affecting the positioning of the two body supports 430 and 450 relative to the frame 110. The body supports 430 and 450 are identical to respective body supports 130 and 150 except for the manner in which they are connected to the frame 410, and similarly, the frame 410 is similar to the frame 110 except for the manner in which it is connected to the body supports 430 and 450.

With respect to the upper body support 430, a conventional nylon strap 403 extends between the bottom end of the upper body support and a conventional lashing clamp or buckle 404 mounted on the bottom rear end of the frame 410. The clamp or buckle 404 places or secures a desired length of strap 403 between the frame 410 and the bottom of the upper body support 430, thereby limiting reclining of the upper body support 430 (i.e. forward pivoting or rotation of the bottom end of the upper body support 430, as well as rearward pivoting or rotation of the head end of the upper body support 430). The strap 403 accommodates pivoting or rotation of the upper body support 430 in the opposite direction (i.e. toward an upright orientation). Also, the sleeve through the upper body support 430 is oversized (in diameter) relative to the support rod or axle 439. This "play" or "slop" accommodates some "wiggle" of the upper body support 430 relative to the frame 410, thereby creating somewhat of a suspended or free floating feel to the upper body support 430.

With respect to the lower body support 450, a conventional bungee cord (or other elongate elastic member) 405 extends between the back of the lower body support 450 and the rear end of the frame 410. The bungee cord 405 is routed through intermediate pulley guides 415 and 416 on the frame 410 to accommodate a safe and desirable amount of stretch or extension of the bungee cord 405 (and associated forward travel of the lower body support 450 relative to the frame 410). The bungee cord 405 biases the lower body support 450 toward the rearward position shown in FIG. 20. Optional "stops" (not shown) may be mounted on the frame 410 or the lower body support 450 to selectively limit forward and/or rearward travel of the latter relative to the former.

Figure 21:
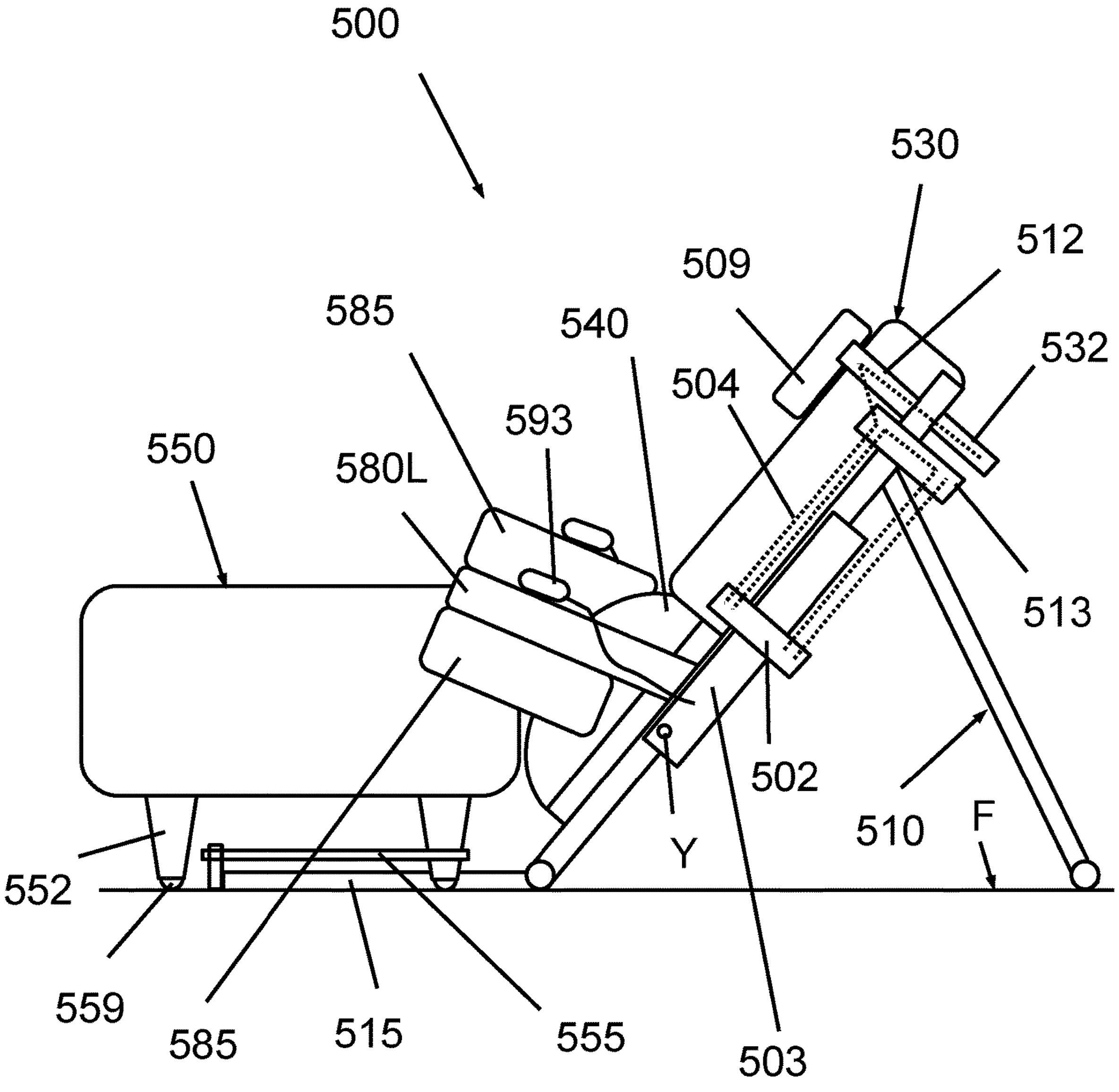
FIG. 21 is a left side view of a sixth apparatus constructed according to the principles of the present invention.
Figure 22:
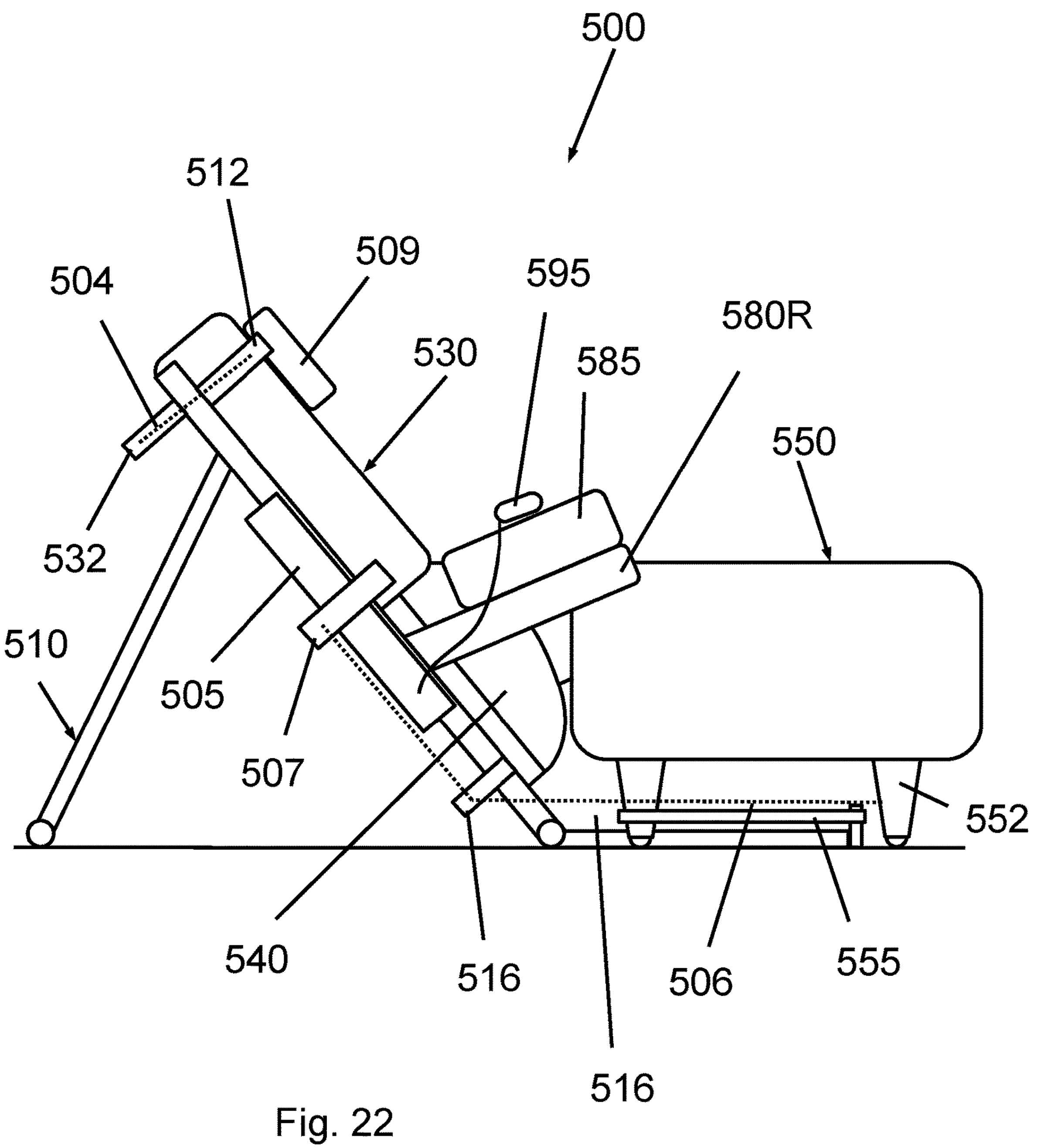
FIG. 22 is an opposite, right side view of the apparatus of FIG. 21.

FIGS. 21-22 show still another alternative embodiment apparatus 500 constructed according to the principles of the subject invention. The apparatus 500 may be described as including the same basic components as the apparatus 100, including a frame 510, an upper body support or back support 530 operatively connected to the frame 510 for pivoting or rotating about a horizontal axis Y; a lower body support or leg support 550 operatively connected to the frame 510 for back and forth translational movement; and left and right armrests 580L and 58CR mounted on respective sides of the frame 510.

The frame 510 is a folding A-frame design of a type used for certain commercially available inversion tables, including for example, a product advertised on Amazon.com as Bigzzia Gravity Heavy Duty Inversion Table with Headrest & Adjustable Protective Belt Back Stretcher Machine for Pain Relief Therapy (Black). When deployed as shown in FIGS. 21-22, the frame 510 occupies a stable position on top of a horizontal floor surface F. The frame 510 includes left and right front legs, left and right rear legs, and front and rear floor engaging tubes interconnected between respective front legs and respective rear legs.

The upper body support 530 is similar in most respects to the upper body support 130 on the apparatus 100. The upper body support 530 may be described as a modified back support of a type used for certain commercially available inversion tables, including the product mentioned in the preceding paragraph. Contrary to such tables, the pivot axis Y for the upper body support 530 is only 13 inches above the floor surface F, which may alternatively be described as at least 13 inches and/or as between 12 and 24 inches (which range includes the pivot axis X on the apparatus 100, as well). The upper portion of the upper body support 530 includes a support structure, an outer upholstered surface, and padding disposed therebetween. The upper or distal edge of the upper body support 530 is 36 inches from the pivot axis Y. The lower portion of the body support comprises a BOSU™ ball 540 that has replaced the upholstery and padding material that would otherwise be present in this region of the inversion table. The lower edge of the BOSU™ ball 540 is 12 inches from the pivot axis. The domed surface of the BOSU™ ball 540 projects several inches outward beyond the user engaging surface of the remaining upholstered portion of the upper body support 530. A pillow 509 is adjustably positioned near the top end of the upper body support 530. Near the upper end of the upper body support 530, a strip of loop-type fasteners is sewn in place to extend down the center of the upper body support 530 and receive and releasably retain a small patch of hook-type fasteners on the back side of the pillow 509.

As shown diagrammatically in FIG. 21, a linear actuator 503 is mounted on the left side of the frame 510. A bracket 502 is mounted on the moving portion of the linear actuator 503 to support a first pulley and a second pulley. Similarly, a bracket 513 is mounted on the frame 510 to support a third pulley, a fourth pulley, and a fifth pulley. On each side of the frame 510, a frame bracket 512 is mounted on an upper end of the frame 510, and the frame brackets 512 extends upward and forward from the frame 510. On each side of the upper body support 530, a support bracket 532 is mounted on an upper end of the upper body support 530, and each support bracket 532 extends downward and rearward from the upper body support 530. A flexible cord 504 has a first end anchored to the lower rearward end of the frame bracket 513. From there, the cord 504 extends to and around the rear pulley on the actuator bracket 502, and then to and around the rear pulley on the frame bracket 513, and then to and around the middle pulley on the frame bracket 513, and then to and around the forward pulley on the actuator bracket 502 and then to and about the forward pulley on the frame bracket 513. From there, the cord 504 extends to and around a guide or pulley on the forward end of the frame bracket 512, and then to and about a guide or pulley on a rearward end of the support bracket 532. From there, the cord 504 extends horizontally across the back of the upper body support 530 to and about a pulley or guide on a rearward end of a right side support bracket 532, and then to the forward end of a right side frame bracket 512, where the other end of the cord 504 is anchored. As a result of this cord and pulley arrangement, the actuator 503 displaces four inches of cord 504 for every inch the actuator 503 expands or contracts.

Each armrest 580L and 58CR includes a rigid bar, an upholstered outer surface, and padding material disposed therebetween to provide a comfortable upper surface to underlie a person's lower arm. In addition, supplemental pads 585 are operatively connected to respective armrests 580L and 58CR for movement between a stowed position directly beneath the armrest (see the left armrest 580L in FIG. 21), and an operative or deployed position directly on top of the armrest (see the right armrest 58CR in FIG. 22). The supplemental pads are upholstered cushions designed to provide relative higher elevation armrest surfaces.

The lower body support or leg support 550 is similar in most respects to a conventional ottoman of a certain size and shape. The leg support 550 defines an upwardly facing surface that is upholstered and supported from below by resilient padding material. Contrary to most conventional ottomans, the upwardly facing surface of the ottoman 550 is twenty-two inches above the floor surface F, which may alternatively be described as at least 18 inches and/or as between 15 inches and 25 inches (which range includes the leg support 150 on the apparatus 100, as well). Also contrary to most conventional ottomans the rectangular shape of the upwardly facing surface is interrupted by a convex recess along its rearward edge. This recess matches the curvature of the domed bladder 540 to avoid interference when the backrest 530 is lowered while the ottoman 550 occupies the position shown in FIGS. 21-22.

Four legs 552 extend downward from the body of the ottoman 550, and conventional wheels 559 are operatively mounted on the bottoms of respective legs 552. A rigid linear track 515 extends forward from the front of the frame 510 to engage the legs 552 of the ottoman 550 and guide the ottoman 550 along a linear path forwards and backwards relative to the frame 510. A bungee cord (or other elongate elastic member) 555 is looped around the front of the track 515 and the rear legs 552 of the ottoman 550 to bias the ottoman 550 away from the frame 510.

As shown diagrammatically in FIG. 22, a linear actuator 505 is mounted on the right side of the frame 510. A bracket 507 is mounted on the moving portion of the linear actuator 505 to support an end of a cord 506. An opposite end of the cord is secured to the front legs 552 of the ottoman 550. A bracket 516 is mounted on the frame 510 to support a guide or pulley that routes the cord 506 from the actuator 505 to the legs 552 of the ottoman 550. The actuator 505 operates to pull the ottoman 552 rearward toward the frame 510, and the bungee cord 555 biases the ottoman 552 forward away from the frame 510 (and to eliminate the possibility of slack in the cord 506).

Manually operated controllers 593 and 595 are operatively connected to respective actuators 503 and 505 via respective wires. Each controller 593 and 595 is shown resting on a respective armrest 580L or 580R. Each controller 593 and 595 includes a toggle switch that extends a respective actuator 503 or 505 when pushed in a first direction and that contracts a respective actuator 503 or 505 when pushed in an opposite, second direction. As a result, a person occupying the apparatus 500 can choose to rotate the backrest 530 clockwise and/or counter-clockwise and/or to move the leg support 550 forward and/or backward. These adjustments can be performed in any combination and/or with any amount of frequency, including continuous. A person can also rock the backrest 530 toward a more upright orientation at his discretion because the cord 504 only places a limit on reclining of the backrest 530.

Figure 23:
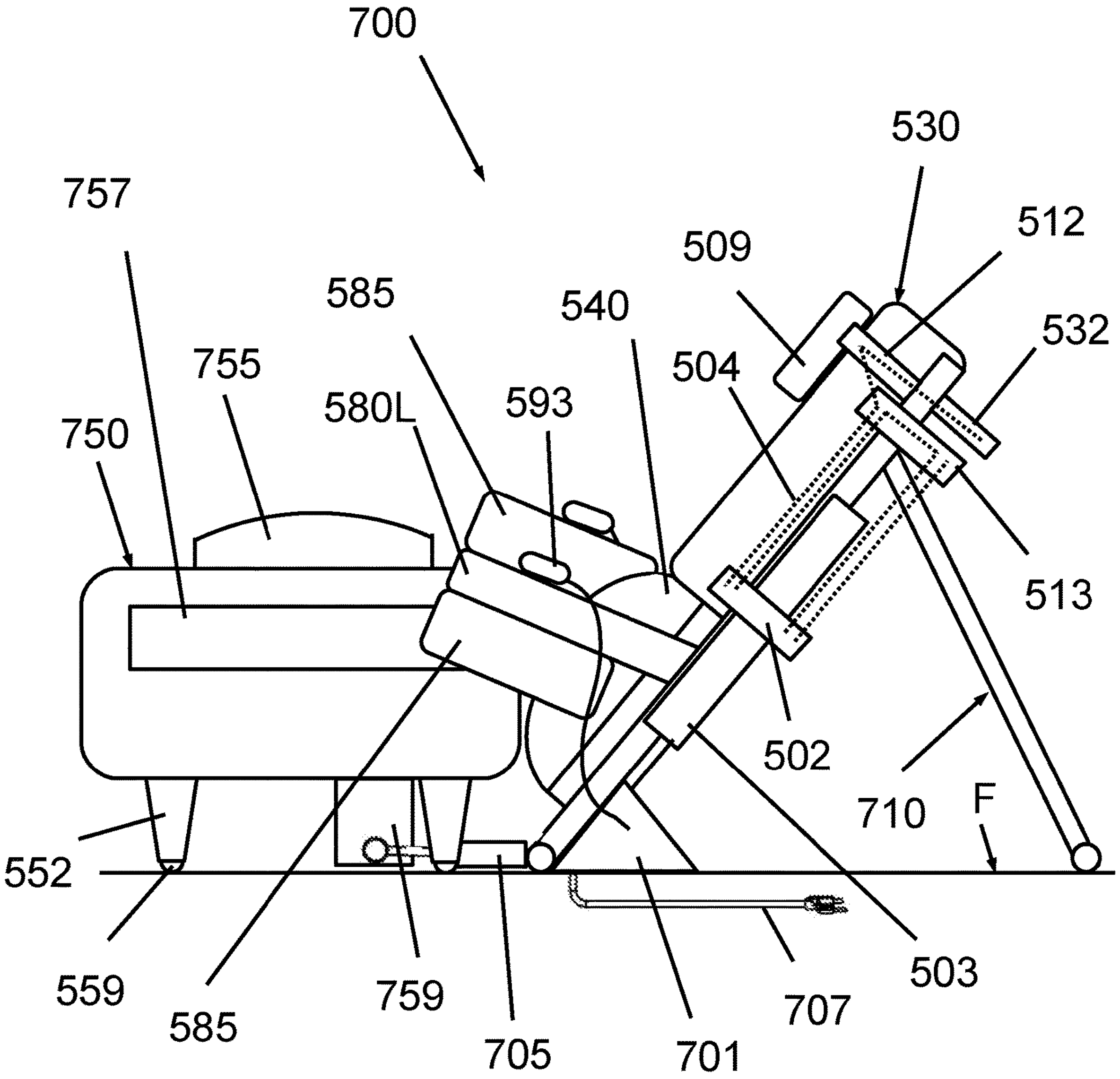
FIG. 23 is a left side view of a seventh apparatus constructed according to the principles of the present invention.

FIG. 23 shows yet another apparatus 700 constructed according to the principles of the subject invention. The apparatus 700 may be described as identical to the apparatus 500, except for aspects of the ottoman 750 and a different mechanism for affecting the positioning of the ottoman 750 relative to the frame 710. The frame 710 is similar to the frame 510 except for the manner in which it is connected to the ottoman 750.

The ottoman 750 is similar in most respects to the ottoman 550, and this description will focus on the differences. The ottoman 750 defines a laterally opening compartment or covered shelf 757 sized and configure to receive a cushion or pillow 755. The cushion 755 defines an upwardly facing surface that is curved or convex. The cushion 755 is selectively removable from the compartment 757 and positioned on top of the ottoman 750 to raise the effective height of the ottoman 750 and/or to provide an alternative shape or configuration for the upwardly facing surface that engages at least the lower legs of a person on the apparatus 700.

A bracket 759 is rigidly mounted on the frame of the ottoman 750 and projects downward proximate the floor F. A linear actuator 705 or other suitable known mechanism is operatively interconnected between the bracket 759 and the frame 710. The actuator 705 replaces the repositioning means or actuator 505 on the apparatus 500 and eliminates the need for a bungee cord. A housing 701 is provided on the frame 710 to house interconnections between components associated with operation of the actuators 705 and 503. A conventional power cord 707 extends from the housing 701 for connection to a power outlet. A similar arrangement may be provided on the previous embodiment 500.

Figure 24:
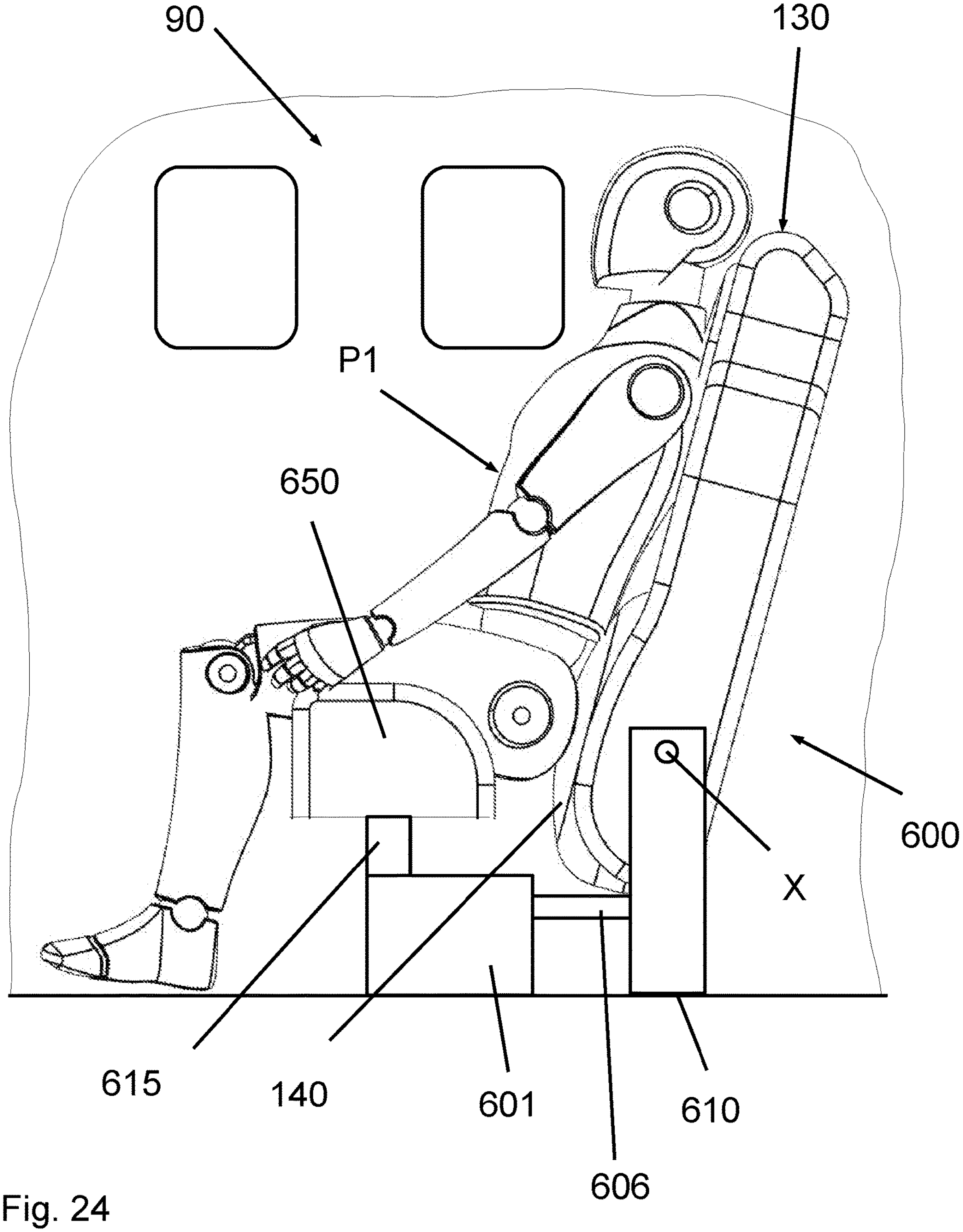
FIG. 24 is a left side view of an airplane seat constructed according to the principles of the present invention.

FIG. 24 shows an embodiment of the subject invention implemented on an otherwise conventional airplane 90. This particular image regards a passenger seat 600, but similar seats 600 could be provided in the cockpit for the pilots, for example. The apparatus 600 may be described as including the same basic components as the apparatus 100, including a frame 610 rigidly secured to the structure of the airplane 90, such as the floor, for example. An upper body support 130 is operatively connected to a frame member for pivoting or rotation about an axis X relative to the frame 610. A domed air bladder 140 is mounted on a lower end of the upper body support 130. A lower body support 650 is operatively mounted on a bracket 615, which in turn, is operatively connected to the frame 110 for both translational movement back and forth relative to the frame 610 and selective vertical height adjustment relative to the frame 610.

The apparatus 600 includes a first linear actuator 606 operatively interconnected between the upper body support 130 and a control unit 601 that is mounted on the frame 610 beneath the lower body support 650. Similarly, a second linear actuator (not shown) is operatively interconnected between the leg support 650 and the control unit 601. In a manner known in the art, power is supplied to each actuator 603 and 605 via the control unit 601. In response to user input and/or pre-programmed control programs, the actuators adjust the back support 130 and/or the leg support 650 relative to the frame 610.

Other forms of the same basic chair 100 may be provided and/or customized for use in other dedicated applications, including for example, the facilities of a dentist or a therapist or a chiropractor. In other words, the subject invention may also be described in terms of a comfortable chair for use on in a vehicle or at a place of business.

The subject may also be described in terms of various methods. Some such methods may be described in terms of making the apparatus disclosed herein, while others may be described in terms of of using the apparatus disclosed herein, and still others may be described in terms of exercise and/or stretching.

One exemplary method of stretching one's back may be described as comprising the steps of: (a) providing an apparatus having a frame configured to occupy a stable upright position relative to an underlying floor surface, an upper body support operatively connected to the base to define a first body supporting surface at a first height above the floor surface, and a lower body support operatively connected to the base to define a second body supporting surface at a second height above the floor surface; (b) supporting one's back on the upper body support; (c) resting one's legs on the lower body support; and (d) allowing one's hips to sink downward into a void between between the upper body support and the lower body support, thereby placing one's lower lumbar region into traction.

The method of the preceding paragraph may further comprise the step of adjusting one said body support relative to the other said body support. For example, the void has a length as measured between proximate portions of the upper body support and the lower body support, and another step in the method may be to adjust the length of the void by reorienting the upper body support relative to the base and/or repositioning the lower body support relative to the upper body support. Such a step may further involve reciprocally increasing and decreasing the length of the void.

In methods where the upper body support is provided with a gas-filled, domed bladder, the supporting step involves positioning one's lower back against the bladder, and the method may include additional steps, including selectively adjusting pressure inside the bladder.

One exemplary method of massaging one's back may be described as comprising the steps of: (a) providing an apparatus having a frame configured to occupy a stable upright position relative to an underlying floor surface, an upper body support operatively connected to the base to define a first body supporting surface at a first height above the floor surface, and a lower body support operatively connected to the base to define a second body supporting surface at a second height above the floor surface; (b) supporting one's back on the upper body support; (c) resting one's legs on the lower body support; and (d) allowing one's hips to sink downward into a void between between the upper body support and the lower body support, thereby placing one's lower lumbar region into traction.

One exemplary method of performing a back therapy exercise may be described as comprising the steps of: (a) providing an apparatus having a frame configured to occupy a stable upright position relative to an underlying floor surface, an upper body support operatively connected the base to define a first body supporting surface at a first height above the floor surface, the first body supporting surface including a domed air bladder, and a lower body support operatively connected to the base to define a second body supporting surface at a second height above the floor surface; (b) supporting one's upper body on the upper body support with one's lower back pressed against the domed air bladder; (c) resting one's lower legs on top of the lower body support; (d) allowing one's derriere to occupy a void between the upper body support and the lower body support; and (e) adjusting at least one said body support relative to the base to vary the void between the upper body support and the lower body support.

One exemplary method of exercising one's abdominal muscles may be described as comprising the steps of: (a) providing an apparatus having a frame configured to occupy a stable upright position relative to an underlying floor surface, an upper body support operatively connected to the base to define a first body supporting surface at a first height above the floor surface, and a lower body support operatively connected to the base to define a second body supporting surface at a second height above the floor surface; (b) supporting one's back on the upper body support; (c) resting one's legs on the lower body support; (d) allowing one's hips to sink downward into a void between the upper body support and the lower body support; and (e) rocking the upper body support back and forth.

The subject invention has been described with reference to specific embodiments and particular applications with the understanding that features of the subject invention and the various embodiments may be practiced individually and/or in various combinations and/or in various types of environments. Also, persons skilled in the art will recognize that various modifications may be made to the specific embodiments, in any of their applications and including mixing and matching of features from multiple embodiments, without departing from the scope of the subject invention. Furthermore, alternative embodiments may be made with different component materials, structures, and/or spatial relationships, and nonetheless fall within the scope of the present invention. In view of the foregoing, the subject invention should be limited only to the extent of allowable claims that issue from this application or any related application.

What is claimed is:

1. An exercise apparatus for use by a person, comprising:

a frame configured to occupy a stable upright position relative to an underlying floor surface, wherein the frame defines a front end and a rear end;

a backrest configured to underlie and support the person's back, wherein the backrest is movably mounted on the frame for movement through a range of orientations, including 30 degrees from vertical; and a leg rest configured to underlie and support the person's legs, wherein the leg rest is operatively connected to the frame for movement between a first position, defining a first distance between the rear end of the frame and a rearwardmost portion of the leg rest, and a second position, defining a second distance between the rear end of the frame and the rearwardmost portion of the leg rest, wherein the second distance is greater than the first distance, and the leg rest is disposed forward of the backrest and cooperates with the backrest to define a variable length gap between the leg rest and the backrest, and the gap increases in length in response to movement of the backrest toward a more vertical orientation, and the gap decreases in length in response to movement of the backrest toward a more horizontal orientation, and the gap increases in length in response to movement of the leg rest toward the second position, and the gap decreases in length in response to movement of the leg rest toward the first position, wherein a person's buttocks spans the gap without any underlying support.

2. The exercise apparatus of claim 1, wherein the backrest includes an inflatable, approximately hemispherical bladder configured and arranged to underlie and engage the person's lower back.

3. The exercise apparatus of claim 2, wherein the inflatable bladder is a smaller diameter equivalent of a BOSU™ ball that defines an outwardly convex surface configured and arranged to engage the person's lumbar region.

4. The exercise apparatus of claim 3, wherein the convex surface defines a diameter of approximately 18 inches, and a height of approximately 7 inches, wherein the height is measured perpendicular to the diameter from a midpoint along the diameter.

5. The exercise apparatus of claim 3, further comprising adjusting means for adjusting air pressure inside the bladder.

6. The exercise apparatus of claim 5, wherein when the backrest approaches a horizontal orientation the bladder must be underinflated to be flush with a top surface of the leg rest.

7. The exercise apparatus of claim 2, wherein the backrest is pivotally mounted on the frame with play for pivoting about a pivot axis and wiggling relative to the pivot axis, and the pivot axis traverses the bladder.

8. The exercise apparatus of claim 1, wherein the leg rest defines a first leg engaging surface that is cushioned, faces upward, and measures at least 12 inches fore to aft and at least 18 inches left to right.

9. The exercise apparatus of claim 8, wherein the leg rest defines a second leg engaging surface that is cushioned, faces rearward, and measures at least 6 inches vertically and at least 18 inches left to right.

10. The exercise apparatus of claim 9, wherein the leg rest defines a third leg engaging surface that is cushioned and forms a curved and uninterrupted transitional juncture between the first leg engaging surface and the second leg engaging surface.

11. The exercise apparatus of claim 9, wherein the backrest is selectively pivotal to an operative orientation, wherein the backrest is engaging the person's back, and the second leg engaging surface is engaging the person's upper legs, and an angle of thirty degrees is defined between the second leg engaging surface and said operative orientation.

12. The exercise apparatus of claim 1, wherein the leg rest includes a rearward section and a forward section, and the forward section is movably connected to the rearward section for movement between a first orientation and a second orientation, wherein the first orientation accommodates mounting and dismounting the apparatus, and the second orientation supports the user's legs during use of the apparatus.

13. The exercise apparatus of claim 1, wherein the backrest is free to pivot through a prescribed range of orientations from predominantly vertical to at least 30 degrees from vertical.

14. The exercise apparatus of claim 1, further comprising a reorienting means for selectively reorienting the backrest relative to the frame.

15. The exercise apparatus of claim 1, further comprising a repositioning means for selectively repositioning the leg rest relative to the frame.

16. The exercise apparatus of claim 1, wherein the leg rest is movable between the first position and the second position while the backrest remains in a fixed orientation.

17. The exercise apparatus of claim 1, wherein the backrest is pivotally mounted on the frame with some play to accommodate wiggle of the backrest relative to the frame, as well as pivoting of the backrest through said range of orientations relative to the frame.

18. A back stretching chair, comprising:

a base configured to occupy a stable upright position relative to an underlying floor surface;

a backrest movably mounted on the frame for movement through a range of orientations, including 30 degrees from vertical, wherein the backrest has an upper portion configured and arranged to engage and support a person's middle back and upper back, and a lower portion configured and arranged to engage and support a person's lower back, wherein the lower portion includes an inflatable, approximately hemispherical dome; and a lower body support configured to engage and support a person's legs, wherein the lower body support is disposed in front of the backrest and cooperates with the backrest to accommodate a person occupying an upright seated position with his legs resting on the lower body support at an elevation above his hips, his upper back and middle back supported in a predominantly vertical orientation by the upper portion of the backrest, his lower back pressing against the inflated dome, and his buttocks occupying a gap between the upper body support and the lower body support.

19. The chair of claim 18, further comprising an adjusting means for adjusting pressure inside the dome.

20. The chair of claim 19, wherein the adjusting means includes a pump and at least one valve operatively interconnected between the pump and the dome.

21. An exercise apparatus for use by a person, comprising:

a frame configured to occupy a stable upright position relative to an underlying floor surface;

a backrest operatively mounted on the frame for pivoting about a pivot axis through a range of orientations from a predominantly vertical orientation to a predominantly horizontal orientation, wherein the backrest includes a cushioned back support configured and arranged to underlie and support the person's upper back and head, and an inflated dome traversed by the pivot axis and configured and arranged to underlie and support the person's lower back; and a leg rest configured to underlie and support the person's legs, wherein the leg rest defines a cushioned leg supporting surface that measures at least twelve inches fore to aft and at least eighteen inches left to right, and the leg rest is operatively mounted on the frame forward of the backrest to define a variable length gap between the leg rest and the backrest, and the gap increases in length in response to movement of the backrest toward a more vertical orientation, and the gap decreases in length in response to movement of the backrest toward a more horizontal orientation, wherein the leg rest and the backrest cooperate to support the person in a seated position with the person's buttocks spanning the gap without any underlying support.

22. The exercise apparatus of claim 21, wherein the leg rest is selectively movable forward and rearward relative to the frame, and the gap increases in length in response to forward movement of the leg rest, and the gap decreases in length in response to rearward movement of the leg rest.

* * * * *